United States Patent
Ueyama et al.

(10) Patent No.: US 9,707,996 B2
(45) Date of Patent: Jul. 18, 2017

(54) VEHICLE DRIVE-CONTROL DEVICE

(75) Inventors: Masao Ueyama, Mishima (JP); Yoji Kunihiro, Susono (JP); Theerawat Limpibunterng, Susono (JP); Takahiro Kojo, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/342,049

(22) PCT Filed: Aug. 31, 2011

(86) PCT No.: PCT/JP2011/069749
§ 371 (c)(1),
(2), (4) Date: Feb. 28, 2014

(87) PCT Pub. No.: WO2013/030974
PCT Pub. Date: Mar. 7, 2013

(65) Prior Publication Data
US 2014/0229068 A1    Aug. 14, 2014

(51) Int. Cl.
*A01B 69/00* (2006.01)
*B62D 6/00* (2006.01)
(Continued)

(52) U.S. Cl.
CPC ........... *B62D 6/002* (2013.01); *B60W 10/16* (2013.01); *B60W 10/20* (2013.01);
(Continued)

(58) Field of Classification Search
CPC .... B62D 15/0265; B62D 1/28; B62D 15/025; B62D 15/0255; B62D 15/0215;
(Continued)

(56) References Cited

U.S. PATENT DOCUMENTS 5,485,378 A * 1/1996 Franke ................. G05D 1/0246
                                                   348/118
5,913,375 A * 6/1999 Nishikawa ............... B62D 6/00
                                                   180/167
(Continued)

FOREIGN PATENT DOCUMENTS

JP      10-105885     4/1998
JP      2000-168599   6/2000
(Continued)

OTHER PUBLICATIONS

International Search Report issued Dec. 6, 2011, in PCT/JP11/069749 filed Aug. 31, 2011.

*Primary Examiner* — Jelani Smith
*Assistant Examiner* — Luis A Martinez Borrero
(74) *Attorney, Agent, or Firm* — Oblon, McClelland, Maier & Neustadt, L.L.P.

(57) ABSTRACT

A vehicle drive-control device which executes trajectory control in which steered wheels are controlled so as to make the vehicle travel along a target trajectory. When the possibility exists that the travel direction of the vehicle may be changed by the trajectory control, at least one of an operation position of a steering input unit operated by a driver; a yaw angle of the vehicle; and a lateral position of the vehicle with respect to a lane is changed before a change in the travel direction is made, thereby giving occupants in the vehicle advance notice of the possibility of a change in vehicle travel direction caused by the trajectory control.

20 Claims, 25 Drawing Sheets

(51) Int. Cl.
  *B62D 11/00* (2006.01)
  *B63G 8/20* (2006.01)
  *B63H 25/04* (2006.01)
  *G05D 1/00* (2006.01)
  *G06F 17/00* (2006.01)
  *B62D 15/02* (2006.01)
  *B60W 10/16* (2012.01)
  *B60W 10/20* (2006.01)
  *B60W 30/045* (2012.01)

(52) U.S. Cl.
  CPC ........... *B60W 30/045* (2013.01); *B62D 15/02* (2013.01); *B62D 15/0255* (2013.01)

(58) Field of Classification Search
  CPC  B62D 15/0235; B62D 15/0245; B62D 13/06; B62D 15/021; B62D 11/003; B62D 5/0463; B62D 5/083; B60W 2550/408; B60W 30/165; B60W 50/098
  USPC ......... 701/117, 25, 41, 44, 58, 68, 70, 1, 42, 701/36, 2, 23, 411, 45, 113, 28, 50, 22, 701/466, 65; 180/421, 282
  See application file for complete search history.

(56) References Cited

U.S. PATENT DOCUMENTS

| | | | | |
|---|---|---|---|---|
| 5,913,376 | A * | 6/1999 | Takei | B60K 31/0058 180/168 |
| 6,009,374 | A * | 12/1999 | Urahashi | B60K 31/0058 340/988 |
| 6,032,098 | A * | 2/2000 | Takahashi | G01C 21/28 701/23 |
| 8,433,467 | B2 * | 4/2013 | Ross-Martin | G05D 1/0234 701/23 |
| 8,954,235 | B2 * | 2/2015 | Lee | B62D 1/286 701/41 |
| 8,977,419 | B2 * | 3/2015 | Lee | B60W 30/12 180/167 |
| 2003/0120405 | A1 * | 6/2003 | Laurent | B62D 1/02 701/41 |
| 2006/0006988 | A1 * | 1/2006 | Harter, Jr. | B60Q 9/008 340/435 |
| 2006/0030987 | A1 * | 2/2006 | Akita | B62D 15/025 701/41 |
| 2007/0118263 | A1 * | 5/2007 | Nelson | A01B 69/008 701/41 |
| 2008/0281490 | A1 * | 11/2008 | Wittig | B62D 5/0457 701/41 |
| 2009/0101430 | A1 * | 4/2009 | Sunaga | B62D 15/025 180/421 |
| 2009/0105907 | A1 * | 4/2009 | Yamaguchi | B62D 5/008 701/41 |
| 2009/0187313 | A1 * | 7/2009 | Kawakami | B62D 6/00 701/45 |
| 2009/0319113 | A1 * | 12/2009 | Lee | B62D 15/025 701/25 |
| 2010/0049375 | A1 * | 2/2010 | Tanimoto | B60T 7/12 701/1 |
| 2010/0082195 | A1 * | 4/2010 | Lee | B62D 15/025 701/25 |
| 2010/0228420 | A1 * | 9/2010 | Lee | B62D 1/28 701/26 |
| 2010/0228427 | A1 * | 9/2010 | Anderson | B60W 30/09 701/31.4 |
| 2010/0241314 | A1 * | 9/2010 | Bohm | B62D 7/1581 701/41 |
| 2010/0268420 | A1 * | 10/2010 | Yasui | B60T 8/17555 701/41 |
| 2010/0308988 | A1 * | 12/2010 | Ieda | B60Q 1/40 340/477 |
| 2011/0011666 | A1 * | 1/2011 | Hori | B62D 5/008 180/444 |
| 2011/0044543 | A1 * | 2/2011 | Nakamura | G06K 9/00798 382/190 |
| 2011/0144865 | A1 * | 6/2011 | Niemz | B62D 5/0469 701/42 |
| 2011/0231095 | A1 * | 9/2011 | Nakada | B60W 30/12 701/301 |
| 2011/0295480 | A1 * | 12/2011 | Shimada | B60K 17/35 701/70 |
| 2012/0046802 | A1 * | 2/2012 | Inou | B60W 30/10 701/1 |
| 2012/0109462 | A1 * | 5/2012 | Hong | B62D 15/0265 701/41 |
| 2012/0123642 | A1 * | 5/2012 | Kojo | B62D 15/025 701/41 |
| 2012/0130593 | A1 * | 5/2012 | Davis | B62D 1/28 701/41 |
| 2012/0203431 | A1 * | 8/2012 | Kojo | B62D 15/025 701/41 |
| 2012/0283910 | A1 * | 11/2012 | Lee | B62D 1/286 701/41 |
| 2013/0060427 | A1 * | 3/2013 | Kataoka | B62D 6/008 701/42 |
| 2013/0082874 | A1 * | 4/2013 | Zhang | G01S 5/0072 342/357.31 |
| 2013/0253773 | A1 * | 9/2013 | Itamoto | B62D 5/049 701/43 |
| 2014/0129084 | A1 * | 5/2014 | Lee | G08G 1/167 701/41 |
| 2014/0136015 | A1 * | 5/2014 | Hayakawa | B60T 7/22 701/1 |
| 2014/0303848 | A1 * | 10/2014 | Bean | B62D 5/0472 701/41 |
| 2015/0259006 | A1 * | 9/2015 | Inoue | B62D 6/007 701/41 |

FOREIGN PATENT DOCUMENTS

| | | |
|---|---|---|
| JP | 2003-141695 | 5/2003 |
| JP | 2004-231096 | 8/2004 |
| JP | 2006-53109 | 2/2006 |
| WO | WO 2008/136456 A1 | 11/2008 |

* cited by examiner

VEHICLE DRIVE-CONTROL DEVICE

TECHNICAL FIELD

The present invention relates to a vehicle drive-control device and, more particularly, to a vehicle travel control device which executes trajectory control in which steered wheels are controlled so as to make the vehicle travel along a target trajectory (a target travel line).

BACKGROUND ART

As one of vehicle drive-control devices, a vehicle drive-control device has been well known which controls steered wheels by means of steered angle varying device which is referred to variable steering gear ratio system (VGRS). In such type of drive-control device, a road is specified by analysis of the image ahead of the vehicle captured by a camera; a target trajectory is set on the basis of the specified road; and steered wheels are controlled so as to make the vehicle travel along the target trajectory.

When a steering wheel which serves as a steering input means is caused to rotate by means of the steered wheels being steered by the trajectory control, the occupants in the vehicle feel annoyance. In order to cope with the problem, it has already been known to control a steered angle varying device and a power steering device so as to keep the rotation of the steering wheel as little as possible even the steered wheels are steered by the trajectory control.

However, the occupants in the vehicle in which the trajectory control is executed cannot foresee the change in vehicle travel direction cased by the trajectory control and, for that reason, may feel anxious and uneasy. For example, in a situation where the curvature of the road ahead of the vehicle varies, the occupants may feel anxious and uneasy as to whether or not the vehicle will travel changing its travel direction appropriately along the road. In another situation where a branch of the road exists ahead of the vehicle, the occupants may feel anxious and uneasy as to whether or not the vehicle will change or will not change the travel direction to select a road which they wish to take and pass the branch.

As one of the means to solve the problem, as is described in the below-mentioned patent citation 1, it has already been proposed to announce the change in travel direction of the vehicle by sound by a navigation unit or to show advance notice as to the change in travel direction of the vehicle on a display such as a meter or the like.

CITATION LIST

Patent Literature 1: Japanese Patent Application Laid-open Publication (kokai) No. Heisei 10 (1998)10-105885

SUMMARY OF INVENTION

Technical Problem

In a case where announcement of the change in travel direction of the vehicle is given by sound, the occupants often fail to recognize the announcement due to their missing hearing and the interference of the announcement with audio function cannot be avoided. On the other hand, in a case where advance notice of the change in travel direction of the vehicle is shown on a display, it is rather difficult to recognize promptly the notice content with respect to the change in travel direction of the vehicle from the indication on the display and it is further difficult for the occupants other than the driver to recognize the advance notice itself.

Disclosure of the Invention

A primary object of the present invention is to give advance notice of the change in travel direction of the vehicle more preferably as compared to where the change in travel direction of the vehicle caused by the trajectory control is noticed in advance by sound and/or indication on a display.

The present invention provides a vehicle drive-control device which executes trajectory control in which steered wheels are controlled so as to make the vehicle travel along a target trajectory, wherein when the possibility exists that the travel direction of the vehicle may be changed by the trajectory control, at least one of an operation position of a steering input means operated by a driver; a yaw angle of the vehicle; and a lateral position of the vehicle with respect to a lane is changed before a change in the travel direction is made.

According to the above-described configuration, at least one of an operation position of a steering input means operated by a driver; a yaw angle of the vehicle; and a lateral position of the vehicle with respect to a lane is changed before a change in the travel direction is made. Accordingly, advance notice of the change in travel direction of the vehicle can be given to the occupants in the vehicle more preferably as compared to where the change in travel direction of the vehicle is noticed in advance by sound and/or indication on a display. Thus, the occupants in the vehicle can more surely foresee the change in vehicle travel direction cased by the trajectory control.

The above-mentioned configuration may be such that: the possibility that the travel direction of the vehicle may be changed by the trajectory control is a possibility due to at least one of the change of the target trajectory caused by the change in curvature of the road which arises as the vehicle travels and the change of the target trajectory effected by the driver at a branch of the road.

According to this configuration, advance notice of the change in travel direction of the vehicle can be given to the occupants in the vehicle in a situation where there is a possibility that the change of the target trajectory is caused by the change in curvature of the road which arises as the vehicle travels or there is a possibility that the change of the target trajectory is effected by the driver at a branch of the road.

In particular, in a situation where there is a possibility that the change of the target trajectory is caused by the change in curvature of the road which arises as the vehicle travels, advance notice of the change in travel direction of the vehicle can be given to the occupants in the vehicle by the change in the operation position of the steering input means and the like before an actual change in the travel direction of the vehicle corresponding to the change in curvature of the road. Accordingly, it is possible to reduce the risk that the occupants may feel anxious and uneasy as to whether or not the vehicle will travel changing its travel direction appropriately along the road.

In a situation where there is a possibility that the change of the target trajectory is effected by the driver at a branch of the road, advance notice of the change or maintenance in the travel direction of the vehicle at a branch of the road is given by the change in the operation position of the steering input means and the like on this side of the branch. Accordingly, since the occupants in the vehicle can decide whether they pass the branch selecting the road as noticed in advance or they pass the branch selecting another road, it is possible to reduce the risk that the occupants may feel anxious and uneasy when the vehicle pass the branch.

The above-mentioned configuration may be such that: at least one of the operation position of the steering input means, the yaw angle of the vehicle, and the lateral position of the vehicle with respect to the road is changed to the same side as the travel direction of the vehicle after the change with the steered angle of the steered wheels being controlled so that the vehicle travels along the target trajectory as accurately as possible.

According to this configuration, the change in the travel direction of the vehicle can be noticed in advance by changing at least one of the operation position of the steering input means, the yaw angle of the vehicle, and the lateral position of the vehicle with respect to the road to the same side as the travel direction of the vehicle after the change with the steered angle of the steered wheels being controlled so that the vehicle travels along the target trajectory as accurately as possible.

The above-mentioned configuration may be such that: the vehicle has a steering relation varying device which varies the relationship between the operation position of the steering input means and the steered angle of front wheels which are steered wheels, and the operation position of the steering input means is varied by controlling the steering relation varying device.

According to this configuration, by controlling the steering relation varying device to vary the relationship between the operation position of the steering input means and the steered angle of front wheels, the operation position of the steering input means can be varied with the steered angle of the front wheels being controlled so that it conforms to a steered angle for achieving the target trajectory as accurately as possible.

The above-mentioned configuration may be such that: the vehicle has steered angle varying devices which vary the steered angles of front and rear wheels, and at least one of the yaw angle of the vehicle and the lateral position of the vehicle with respect to the road is changed by controlling the steered angles of front and rear wheels by means of the steered angle varying devices.

According to this configuration, the change in the travel direction of the vehicle can be noticed in advance by controlling the steered angles of front and rear wheels to change at least one of the yaw angle of the vehicle and the lateral position of the vehicle with respect to the road.

The above-mentioned configuration may be such that: the vehicle has a steering relation varying device which varies the relationship between the operation position of said steering input means and an auxiliary steering assist force generation device, and the operation position of said steering input means is changed with the steered angle of the front wheels being controlled by controlling said steered angle varying devices and said auxiliary steering assist force generation device.

According to this configuration, since the operation position of the steering input means can be changed with the steered angle of the front wheels being controlled, the operation position of the steering input means can be changed with the steered angle of the front wheels being controlled so that it conforms to a steered angle for achieving the target trajectory as accurately as possible.

The above-mentioned configuration may be such that: the vehicle has a steering relation varying device which varies the relationship between the operation position of the steering input means and the steered angle of front wheels and a steered angle varying device for rear wheels which varies the steered angle of the rear wheels, and at least one of the yaw angle of the vehicle and the lateral position of the vehicle is changed by controlling the steering relation varying device and the steered angle varying device for rear wheels.

According to this configuration, the change in the travel direction of the vehicle can be noticed in advance by controlling the steering relation varying device and the steered angle varying device for rear wheels to change at least one of the yaw angle of the vehicle and the lateral position of the vehicle with respect to the road.

The above-mentioned configuration may be such that: the amount by which at least one of the operation position of the steering input means, the yaw angle of the vehicle, and the lateral position of the vehicle with respect to the lane is changed is increased when the change degree of the travel direction of the vehicle is high as compared to where the change degree of the travel direction of the vehicle is low.

According to this configuration, the control amount for giving advance notice of the change in the travel direction of the vehicle can be increased to effectively notice in advance the change in the travel direction of the vehicle when the change degree of the travel direction of the vehicle is high as compared to where the change degree of the travel direction of the vehicle is low.

The above-mentioned configuration may be such that: in a situation where the vehicle is laterally offset with respect to the center of the road, the amount by which at least one of the operation position of the steering input means, the yaw angle of the vehicle, and the lateral position of the vehicle with respect to the road is changed in a direction increasing the amount of the offset is smaller as compared to the amount by which the change is made in a direction decreasing the amount of the offset.

According to this configuration, when the amount of the offset of the vehicle is increased by the control for giving advance notice of the change in the travel direction of the vehicle, control amount for the advance notice can be decreased to reduce uneasy feeling the occupants may feel. Conversely, when the amount of the offset of the vehicle is decreased by the control for giving advance notice of the change in the travel direction of the vehicle, control amount for the advance notice can be increased to effectively notice in advance the change in the travel direction of the vehicle.

The above-mentioned configuration may be such that: the amount by which at least one of the operation position of the steering input means, the yaw angle of the vehicle, and the lateral position of the vehicle with respect to the road is changed is decreased when a running safety of the vehicle is low as compared to where a running safety of the vehicle is high.

According to this configuration, the control amount for giving advance notice of the change in the travel direction of the vehicle can be decreased when a running safety of the vehicle is low as compared to where a running safety of the vehicle is high. Accordingly, it is possible to reduce the risk that a running safety of the vehicle is further lowered by the control for giving advance notice of the change in the travel direction of the vehicle. Conversely, the degree can be decreased in which the control amount for giving advance notice of the change in the travel direction of the vehicle is decreased when a running safety of the vehicle is high as compared to where a running safety of the vehicle is low, which enables to effectively notice in advance the change in the travel direction of the vehicle.

The above-mentioned configuration may be such that: when the amount by which at least one of the operation position of the steering input means; the yaw angle of the vehicle, and the lateral position of the vehicle with respect to the road is changed is small, speed of the change is increased as compared to where the change amount is large.

According to this configuration, when the control amount for giving advance notice of the change in the travel direction of the vehicle is small, the speed to change the control amount can be increased to make it easier for the occupants in the vehicle to recognize the advance notice of the change in the travel direction of the vehicle. Conversely, when the control amount for giving advance notice of the change in the travel direction of the vehicle is large, the speed to change the control amount can be decreased to reduce the risk that the occupants in the vehicle feel uneasy due to rapid variation in the control amount for giving advance notice of the change in the travel direction of the vehicle.

The above-mentioned configuration may be such that: the possibility that the travel direction of the vehicle may be changed by the trajectory control is a possibility due to the change of the target trajectory effected by the driver at a branch of the road, and at least one of the operation position of the steering input means, the yaw angle of the vehicle, and the lateral position of the vehicle with respect to the road is changed to the side opposite to the travel direction of the vehicle after the change.

According to this configuration, the control amount for giving advance notice of the change in the travel direction of the vehicle is changed in the direction opposite to the travel direction of the vehicle after the change. Accordingly, since the operation amount by the driver is increased when he or she wishes to change the target trajectory at a branch, it is possible to desirably decide whether or not the driver wishes to change the target trajectory on the basis of the operation amount by the driver.

The above-mentioned configuration may be such that: when there is a branch having travel direction different from that determined by the target trajectory which has been set, and there is a possibility exists that the travel direction of the vehicle may be changed due to the change of the target trajectory effected by the driver, a decision is made as to whether or not the target trajectory is to be altered on the basis of the operation by the driver on the steering input means.

According to this configuration, when the driver wishes to change the target trajectory, a decision can be made as to whether or not the target trajectory is to be altered on the basis of the operation by the driver on the steering input means which is conducted so as to change the travel direction.

The above-mentioned configuration may be such that: a decision-making travel section for deciding whether or not the target trajectory is to be altered is set on this side of the branch, and a decision is made as to whether or not the target trajectory is to be altered on the basis of the operation conducted by the driver on the steering input means in the decision-making travel section.

According to this configuration, a decision can be made as to whether or not the target trajectory is to be altered on the basis of the operation conducted by the driver on the steering input means in the decision-making travel section.

The above-mentioned configuration may be such that: an end point of the decision-making travel section is set on this side of the branch and a start point of the decision-making travel section is set at a position which is spaced by a predetermined distance on this side of the end point.

According to this configuration, a decision-making travel section having a prescribed distance can be set on this side of the branch.

The above-mentioned configuration may be such that: when the amount and/or speed of the operation conducted by the driver on the steering input means after the vehicle has passed the decision-making travel section are large, the change of the target trajectory is effected more quickly as compared to where the amount and/or speed are small.

According to this configuration, the target trajectory can be altered as necessary even after the vehicle has passed the decision-making travel section, and the speed of the alteration can be variably set in accordance with the amount and/or speed of the operation conducted by the driver.

DESCRIPTION OF EMBODIMENTS

Some preferred embodiments of the present invention will be described in detail with reference to the accompanying drawings.

First Embodiment

Figure 1:
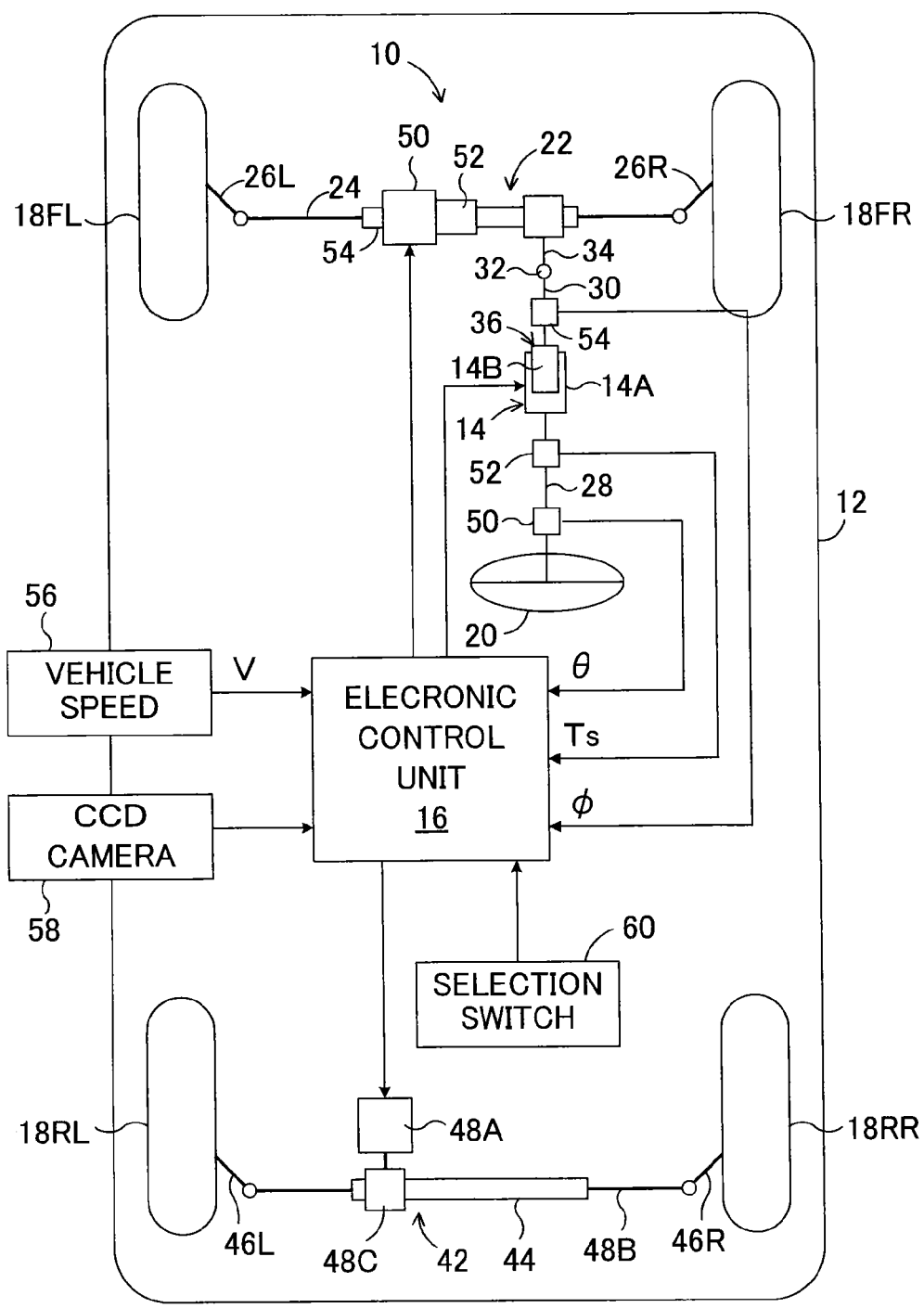
FIG. 1 is a schematic configurational view showing a first embodiment of a vehicle drive-control device according to the present invention which is applied to a vehicle equipped with an electric power steering device and a rear wheel steering device.

FIG. 1 is a schematic configurational view showing a first embodiment of a vehicle drive-control device according to the present invention which is applied to a vehicle equipped with an electric power steering device and a rear wheel steering device.

Referring to FIG. 1, a vehicle drive-control device 10 is installed in a vehicle 12 and includes a steered angle varying unit 14 and an electronic control unit 16 for controlling the steered angle varying unit. In FIG. 1, reference numerals 18FL and 18FR respectively denote left and right front wheels, which are steerable wheels; and 18RL and 18RR respectively denote left and right rear wheels. The right and left front wheels 18FR, 18FL are steered by an electronic power steering unit 22 of a rack and pinion type via a rack bar 24 and tie rods 26L and 26R, respectively with the steering unit being actuated in response to steering operation on a steering wheel 20 by a driver.

The steering wheel 20 which serves as a steering input means is drivingly connected to a pinion shaft 34 of the power steering unit 22 via an upper steering shaft 28, the steered angle varying unit 14, a lower steering shaft 30, and a universal joint 32. The steered angle varying unit 14 includes an electric motor 36 for supplementary steering driving. The electric motor 36 has a housing 14A linked to a lower end of the upper steering shaft 28 and a rotor 14B linked to an upper end of the lower steering shaft 30.

As is apparent from the above, the steered angle varying unit 14 rotates the lower steering shaft 30 relative to the upper steering shaft 28 so as to drive, for supplementary steering, the left and right front wheels 18FL and 18FR relative to the steering wheel 20. The steered angle varying unit 14 serves as a variable gear ratio system (VGRS), i.e. steering transmission ratio varying unit which increases and decreases a steering gear ratio (a reverse of steering transmission ratio) is controlled by a steering angle control section of the electronic control unit 16.

The left and right rear wheels 18RL and 18RR are steered by an electric power steering unit 44 of a rear steering device 42 via tie rods 46L and 46R independently of steering of the front left and right wheels 18FL and 18FR, and the rear steering device 42 is controlled by the steering section of the electronic control unit 16.

The illustrated rear steering device 42 is an electric auxiliary steering device of well-known configuration, and has an electric motor 48A and a motion transfer mechanism 48C of screw type, for example, which transfers rotational motion of the electric motor 48A to reciprocal motion of a relay rod 48B. The relay rod 48B cooperates with the tie rods 46L and 46R and knuckle arms not illustrated in the figure to constitute a wheel turning mechanism which turns the left and right rear wheels 18RL and 18RR to steer by means of reciprocation of the relay rod 48B.

Although not shown in detail in the figure, the motion transfer mechanism 48C transfers rotational motion of the electric motor 48A to reciprocal motion of a relay rod 48B but does not transmit forces which the left and right rear wheels 18RL and 18RR receive from road surface to the electric motor 48A so that the electric motor 48A is not rotated by the force transmitted to the relay rod 48B.

In the illustrated embodiment, the electric power steering unit 22 is an electric power steering unit located concentric with the rack bar. The power steering unit 22 includes an electric motor 50 and a mechanism that converts the rotational torque of the electric motor 50 into a force in a reciprocating direction of the rack bar 24 such as, for example, a ball-screw type converting mechanism 52. The power steering unit 22 is controlled by an electric power steering (EPS) unit control section of the electronic control unit 16 and generates steering assist torque to drive the rack bar 24 relative to a housing 54 so as to reduce steering load on the driver.

It is to be understood that the steered angle varying unit 14 may be of any configuration so long as it cooperates with an auxiliary steering assist force generation device to vary the steered angle of the left and right front wheels without depending on the steering operation of a driver and to vary the rotation angle of the steering wheel 20. In similar, the steering assist force generation device may be of any configuration so long as it can generate auxiliary steering assist force. Further, while the steering input means is the steering wheel 20 and its operational position is rotation angle, the steering input means may be a steering lever of joy stick type and its operational position may be reciprocal operation position.

In the embodiment shown in the figure, the upper steering shaft 28 is provided with a steering angle sensor 50 which detects a rotational angle of the upper steering shaft as a steering angle $\theta$ and a steering torque sensor 52 which detects a steering torque Ts. The lower steering shaft 30 is provided with a rotation angle sensor 54 which detects a rotation angle of the lower steering shaft as a pinion angle (rotation angle of the pinion shaft 34) $\phi$. Signals indicative of a steering angle $\theta$, a steering torque Ts and a pinion angle $\phi$ are input to the steering angle control section and the EPS control section of the electronic control unit 16.

It is to be noted that the rotation angle sensor 54 may be replaced with a rotation angle sensor which detects relative rotation angle in the steered angle varying unit 14, i.e. rotation angle of the lower steering shaft 30 relative to the upper steering shaft 28.

The vehicle 12 is provided with a forward CCD camera 58 which captures a forward image ahead of the vehicle and a selection switch 60 which is operated by an occupant of the vehicle to select on and off of a lane keeping assist (LKA) control for making the vehicle to travel along a lane. A signal indicative of the forward image information ahead of the vehicle captured by the CCD camera 58 is input to the drive control section of the electronic control unit 16. It is to be noted that forward image information ahead of the vehicle and lane information may be obtained by a means other than CCD camera.

The individual sections of the electronic control unit 16 may be those which comprise microcomputers and each microcomputer may have CPU, ROM, RAM, and an input/output port connected with one another via a bidirectional common bus. The steering angle sensor 50, the steering torque sensor 52 and the rotation angle sensor 54 detect a steering angle $\theta$, a steering torque Ts and a pinion angle $\phi$, respectively with the detected variables being positive when steering or vehicle turning is conducted in left turning direction of the vehicle.

As will be described in detail hereinafter, the electronic control unit 16 executes a trajectory control, which is referred to a lane keeping assist control (LKA control) by controlling the steered angle varying unit 14 and the electric power steering unit 22 in accordance with the flowcharts shown in FIG. 2 and the like. In addition, the electronic control unit 16 rotates the steering wheel 20 prior to its rotation for varying travelling direction of the vehicle by the trajectory control when radius rate of a target trajectory for making the vehicle to travel along a lane changes as the vehicle travels.

Next, referring to the flowchart shown in FIG. 2, the vehicle drive-control in the first embodiment will be explained. It is to be noted that the control in accordance with the flowcharts and the block diagram shown in FIGS. 2-6 is started when an ignition switch not shown in the figure is turned on, and is repeatedly executed at predetermined intervals.

Figure 2:
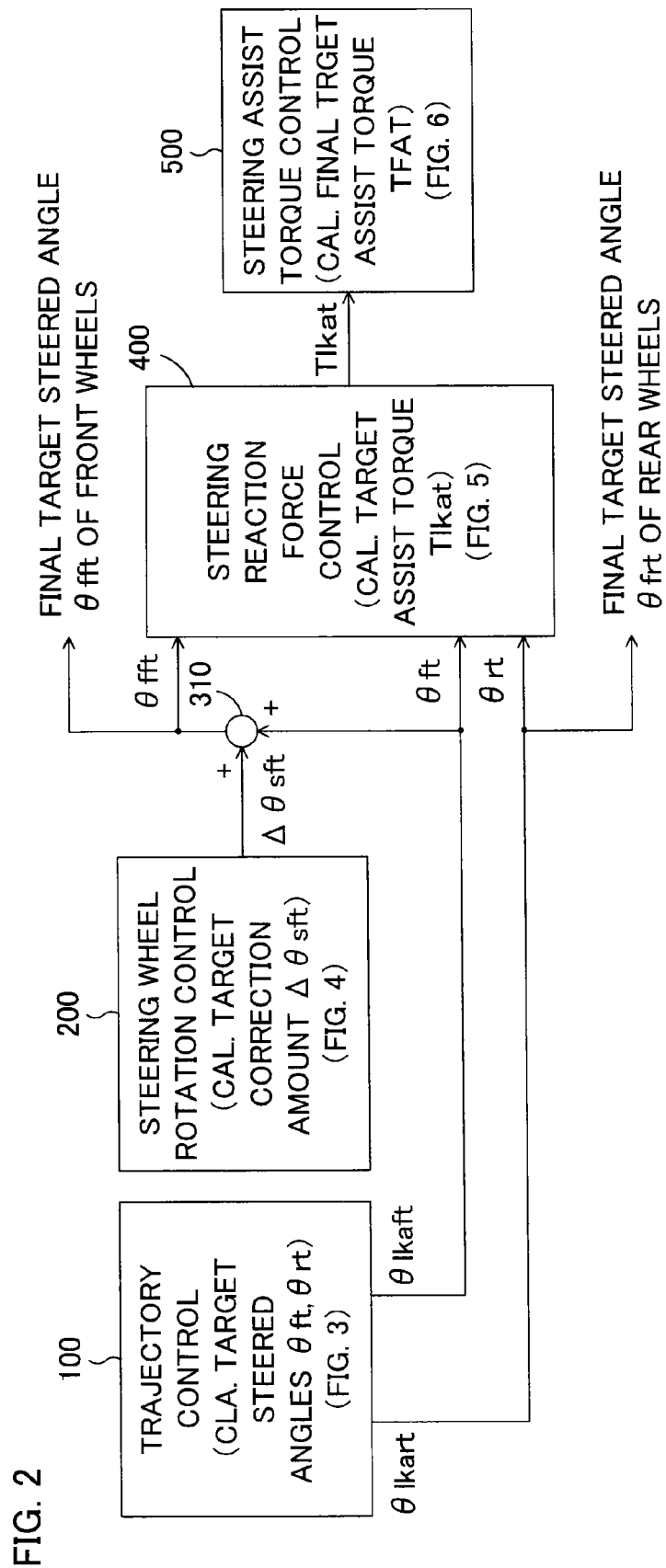
FIG. 2 is a block diagram illustrating the entire of the vehicle drive-control in the first embodiment.
Figure 3:
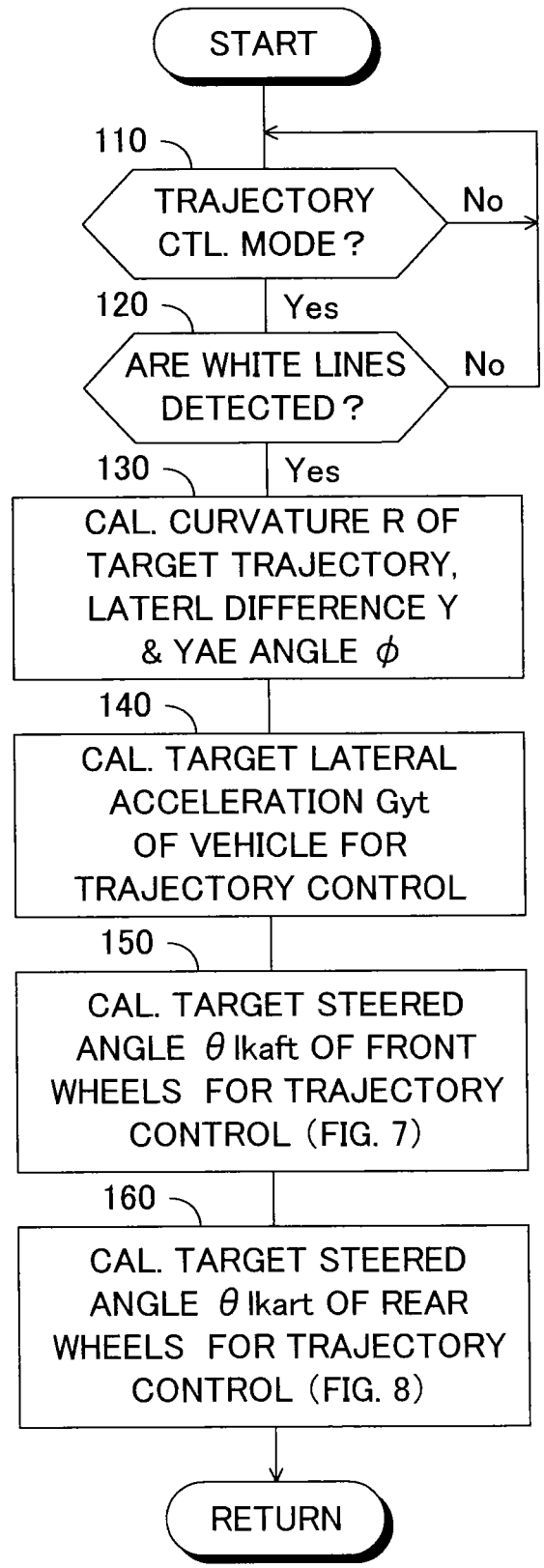
FIG. 3 is a flowchart showing the control routine in the trajectory control block shown in FIG. 2.
Figure 4:
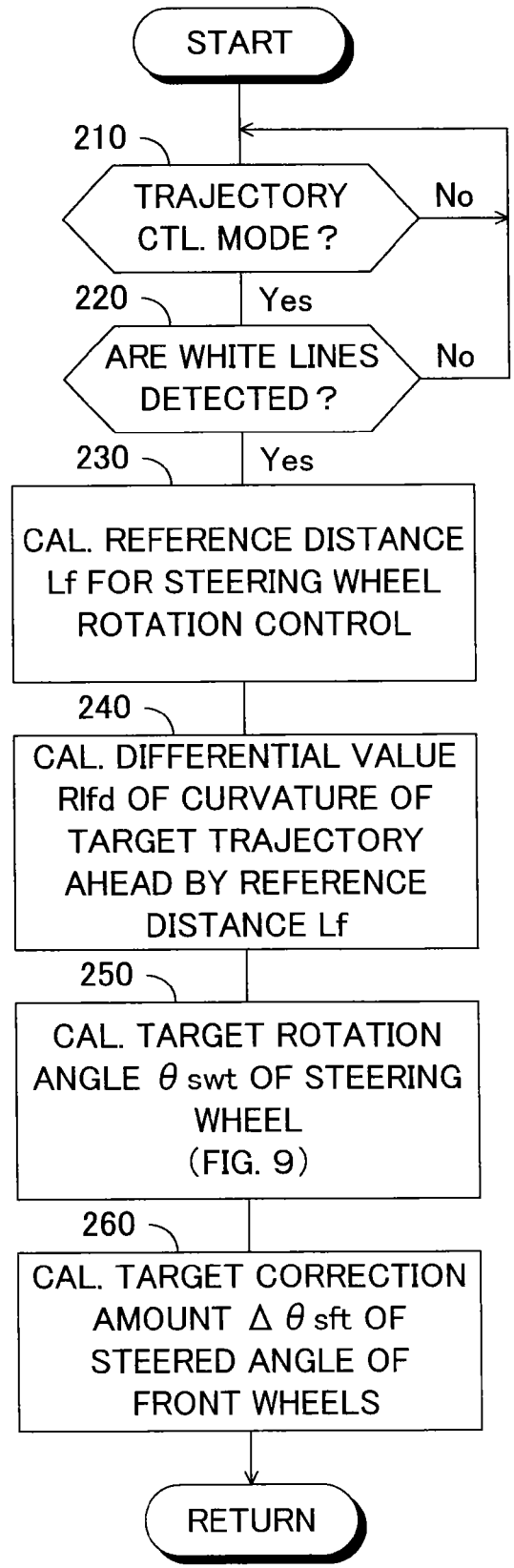
FIG. 4 is a flowchart showing the control routine in the steering wheel rotation control block shown in FIG. 2.
Figure 5:
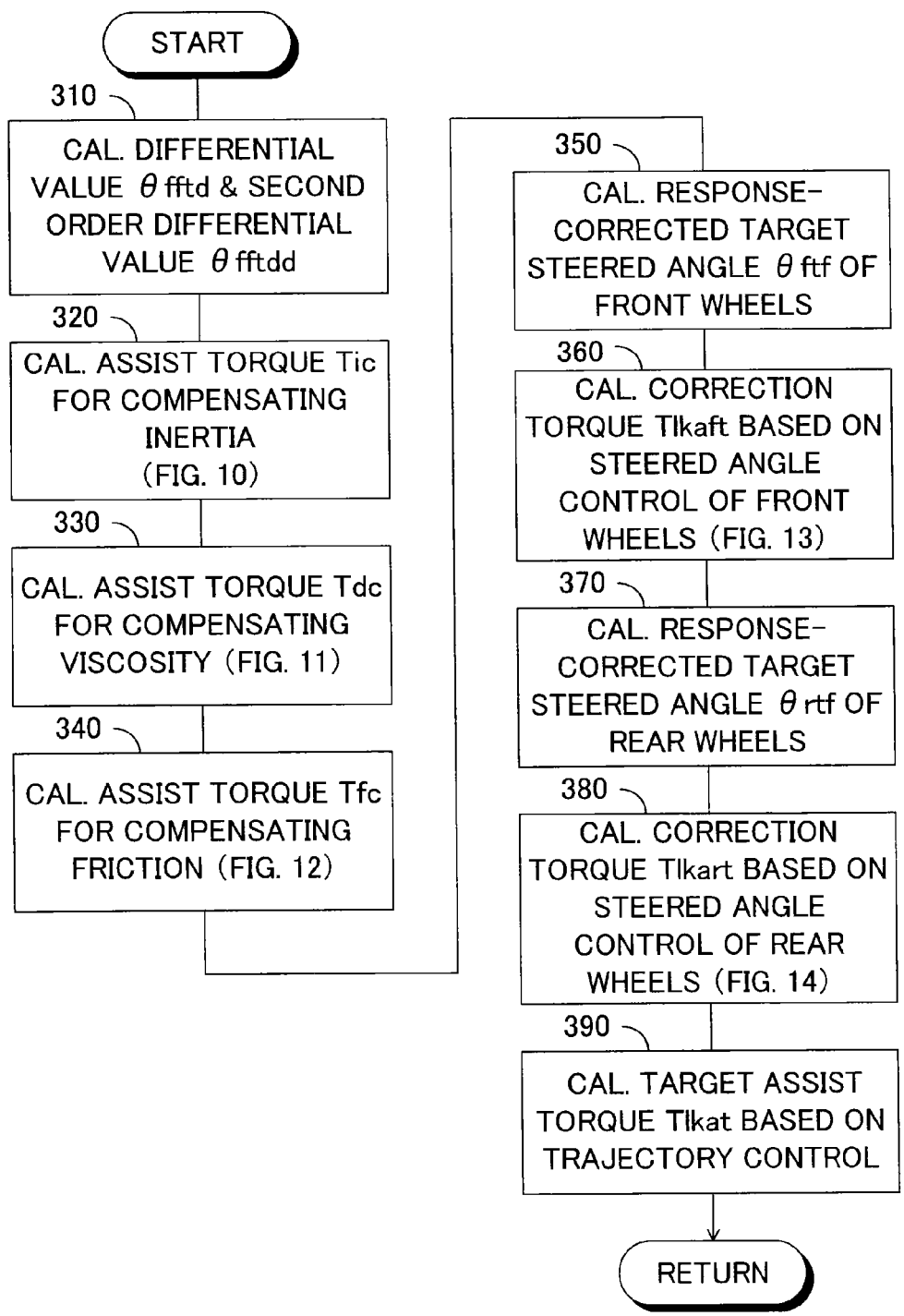
FIG. 5 is a flowchart showing the control routine in the steering reaction force control block shown in FIG. 2.
Figure 6:
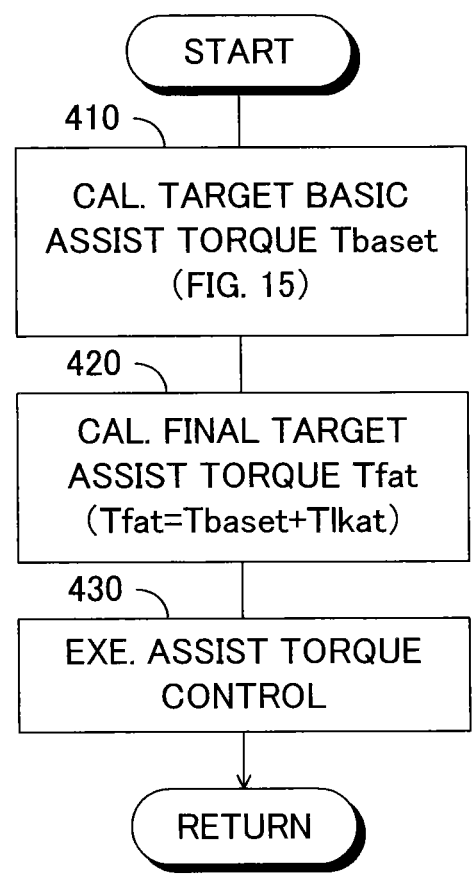
FIG. 6 is a flowchart showing the control routine in the steering assist torque control block shown in FIG. 2.

In particular, FIG. 2 is a block diagram illustrating the entire of the vehicle drive-control in the first embodiment and FIG. 3 is a flowchart showing the control routine in the trajectory control block shown in FIG. 2. FIG. 4 is a flowchart showing the control routine in the steering wheel rotation control block shown in FIG. 2 and FIG. 5 is a flowchart showing the control routine in the steering reaction force control block shown in FIG. 2. Further, FIG. 6 is a flowchart showing the control routine in the steering assist torque control block shown in FIG. 2.

The control in the trajectory control block 100 shown in FIG. 2 is executed in accordance with the flowchart shown in FIG. 3 by the vehicle drive-control section of the electronic control unit 16. A target steered angle $\theta$lkaft of the front wheels and a target steered angle $\theta$lkart of the rear wheels for making the vehicle travel along the target trajectory are calculated and signals indicative of them are output to the steering reaction force control block 400 as a target steered angle $\theta$ft of the front wheels and a target steered angle $\theta$rt of the rear wheels for the trajectory control.

The control in the steering wheel rotation control block 200 shown in FIG. 2 is executed in accordance with the flowchart shown in FIG. 4 by the vehicle drive-control section of the electronic control unit 16. A target rotation angle $\theta$swt is calculated which is to rotate the steering wheel 20 for announcing change in travelling direction of the vehicle prior to actual change in travelling direction of the vehicle caused by the trajectory control. In addition, a target correction amount $\Delta\theta$sft of the steered angle of the front wheels for rotating the steering wheel 20 by the target rotation angle $\theta$swt is calculated and a signal indicative of it is output to an adder 310.

The target correction amount $\Delta\theta$sft is summed with the target steered angle $\theta$ft of the front wheels by the adder 310 to calculate a final target steered angle $\theta$fft of the front wheels. The steered angle varying unit 14 is controlled by the steering angle control section of the electronic control unit 16 so that steered angle $\theta$f the front wheels conforms to the final target steered angle $\theta$fft. Target steered angle $\theta$rt of the rear wheels is set to a final target steered angle $\theta$frt by the steering angle control section of the electronic control unit 16 and the electric power steering unit 44 of the rear steering device 42 is controlled by the section so that steered angle $\theta$r of the rear wheels conforms to the final target steered angle $\theta$frt of the rear wheels.

The control in the steering reaction force control block 400 is executed in accordance with the flowchart shown in FIG. 5 by the EPS control section of the electronic control unit 16. A target assist torque Tlkat for controlling the steered angle θf the front wheels to the target steered angle θlkaft of the trajectory control is calculated on the basis of the target steered angle θft of the front wheels, the target steered angle θrt of the rear wheels and the like. The target assist torque Tlkat is a target assist torque for controlling steered angle θf of the front wheels to the target steered angle θlkaft of the trajectory control by the cooperation of the steered angle varying unit 14 and the electric power steering unit 22 without rotating the steering wheel 20.

The control in the steering assist torque control block 500 is executed in accordance with the flowchart shown in FIG. 6 by the EPS control section of the electronic control unit 16. A sum of a target basic assist torque Tbaset for reducing steering burden on the driver and the target assist torque Tlkat is calculated as a final target assist torque Tfat. The electric power steering unit 22 is controlled so that steering assist torque conforms to the final target assist torque Tfat.

<Trajectory Control Routine>

In step 110 in the trajectory control routine shown in FIG. 3, after necessary information is read in, a decision is made as to whether or not the selection switch 60 is on, i.e. whether or not the trajectory control mode is selected. When a negative decision is made, reading-in of necessary information and step 100 are again conducted, while when an affirmative decision is made, the control proceeds to step 120.

In step 120, a decision is made as to whether or not white lines of a lane are detected on the basis of forward image information captured by CCD camera 58, i.e. whether or not the lane can be specified. When a negative decision is made, as a target trajectory for the trajectory control cannot be set, the control returns to the step of reading-in of necessary information and step 110, while when an affirmative decision is made, the control proceeds to step 130.

In step 130, a target trajectory of the vehicle is set by analysis and the like of the forward image information captured by CCD camera 58, and a curvature R (the inverse of radius) of the target trajectory and a lateral difference Y and a yaw angle φ of the vehicle relative to the target trajectory are calculated. A target trajectory of the vehicle may be set on the basis of the information sent from a navigation unit not shown in the figure or may be set on the basis of the combination of image information analysis and the information sent from a navigation unit.

Although a curvature R of the target trajectory and the like are parameters necessary for executing the trajectory control for making the vehicle travel along a target trajectory, as the manners for calculating the parameters do not constitute an essential part of the present invention, the parameters may be calculated in any manners. In particular, since present position of the vehicle gradually changes as the time lapses, a curvature R of the target trajectory may be calculated as a function of the time t lapsed from now.

In step 140, a target lateral acceleration Gyt of the vehicle required to make the vehicle travel along the target trajectory is calculated on the basis of the above-mentioned parameters for trajectory control. As the manner for calculating the target lateral acceleration Gyt does not constitute an essential part of the present invention, the target lateral acceleration Gyt may be calculated in any manner. For example, a map indicating the relation between the above-mentioned parameters for trajectory control and a target lateral acceleration Gyt may be set and a target lateral acceleration Gyt may be calculated from the map on the basis of the above-mentioned parameters.

Figure 7:
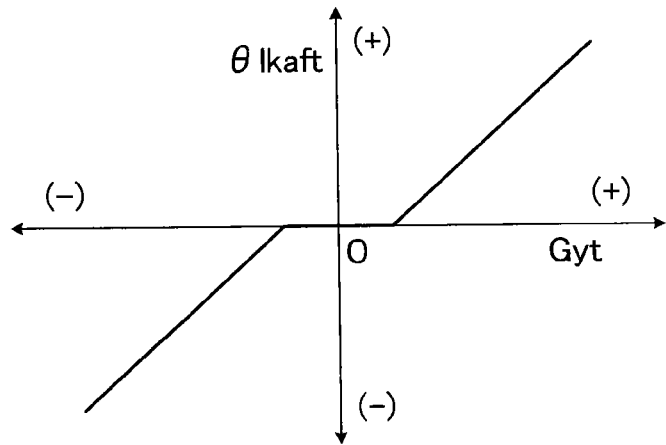
FIG. 7 is a map for calculating a target steered angle θlkaft of the front wheels for trajectory control on the basis of the target lateral acceleration Gyt.

In step 150, a target steered angle θlkaft of the front wheels for trajectory control is calculated from a map shown in FIG. 7 on the basis of the target lateral acceleration Gyt. A signal indicative of the value is output as a target steered angle θft of the front wheels for trajectory control to the adder 310 and the steering reaction force control block 400.

Figure 8:
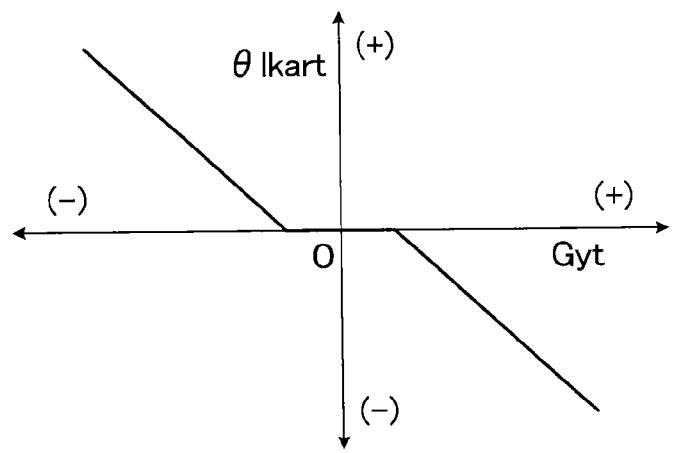
FIG. 8 is a map for calculating a target steered angle θlkart of the rear wheels for trajectory control on the basis of the target lateral acceleration Gyt.

In step 160, a target steered angle θlkart of the rear wheels for trajectory control is calculated from a map shown in FIG. 8 on the basis of the target lateral acceleration Gyt. A signal indicative of the value is output as a target steered angle θrt of the rear wheels for trajectory control to the steering reaction force control block 400 and to the steering angle control section of the electronic control unit 16.

<Steering Wheel Rotation Control Routine>

Steps 210 and 220 in the steering wheel rotation control routine shown in FIG. 4 are conducted as in step 110 and 120, respectively, in the above-described trajectory control routine.

In step 230, a reference distance Lf for the steering wheel rotation control is calculated. Rotation of the steering wheel for announcing change in vehicle travel direction to occupants in the vehicle should be conducted at a position that is backwardly spaced from the position where actual change in vehicle travel direction occurs and the distance between the positions should be increased as vehicle speed V increases. Accordingly, the reference distance Lf is calculated so that it increases as vehicle speed V increases.

In step 240, a curvature R1f of the target trajectory at a position spaced forward by the reference distance Lf from the present position is determined on the basis of the analysis results of the image information forward of the vehicle and vehicle speed V. A time differential value of the curvature R1f is also calculated as a changing rate R1fd of the curvature R of the target trajectory.

Figure 9:
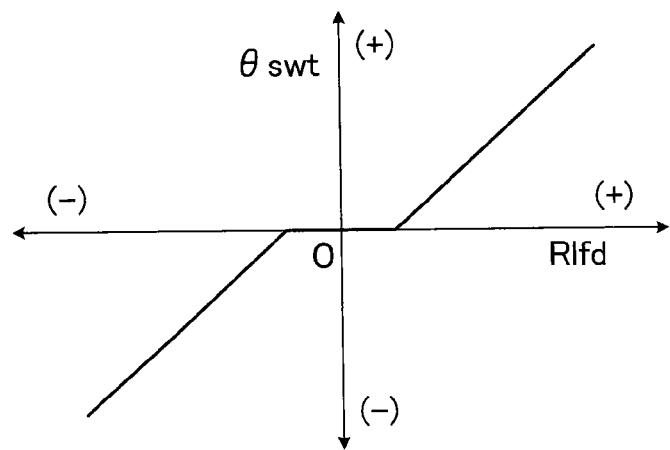
FIG. 9 is a map for calculating a target rotation angle θswt of the steering wheel on the basis of the changing rate R1fd of the curvature R of the target trajectory.

In step 250, a target rotation angle θswt of the steering wheel 20 is calculated from a map shown in FIG. 9 on the basis of the changing rate R1fd of the curvature R of the target trajectory. Although not shown in FIG. 4, in a situation where a target correction amount Δθsft of the steered angle of the front wheels rapidly changes in magnitude due to rapid change of the changing rate R1fd of the curvature R of the target trajectory in magnitude, the target correction amount Δθsft may be modified so that it gradually changes in magnitude.

In step 260, a target correction amount Δθsft of the steered angel of the front wheels for rotating the steering wheel 20 by the target rotation angle θswt is calculated on the basis of the target rotation angle θswt, a gear ratio of a steering system and the like.

<Steering Reaction Force Control Routine>

In steps 310 in the steering reaction force control routine shown in FIG. 5, are calculated a differential value θfftd and a second order differential value θfftdd of a final target steered angle θfft of the front wheels which is calculated by summing the target steered angle θft of the front wheels and the target rotation angle θswt by the adder 310.

Figure 10:
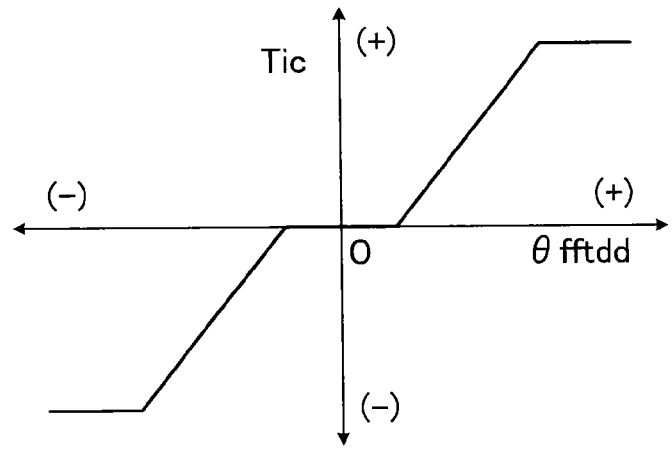
FIG. 10 is a map for calculating an assist torque Tic for compensating inertia of the electric power steering unit and the like on the basis of the second order differential value θfftdd of the final target steered angle θfft of the front wheels.

In steps 320, an assist torque Tic for compensating inertia of the steering system and the electric power steering unit 22 is calculated from a map shown in FIG. 10 on the basis of the second order differential value θfftdd of the final target steered angle θfft of the front wheels.

Figure 11:
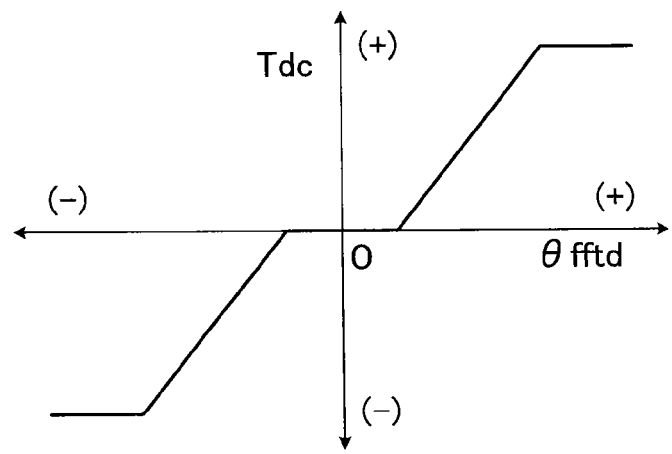
FIG. 11 is a map for calculating an assist torque Tdc for compensating viscosity in the electric power steering unit and the like on the basis of the differential value θfftd of the final target steered angle θfft of the front wheels.

In steps 330, an assist torque Tdc for compensating viscosity in the steering system and the electric power steering unit 22 is calculated from a map shown in FIG. 11 on the basis of the differential value θfftd of the final target steered angle θfft of the front wheels.

Figure 12:
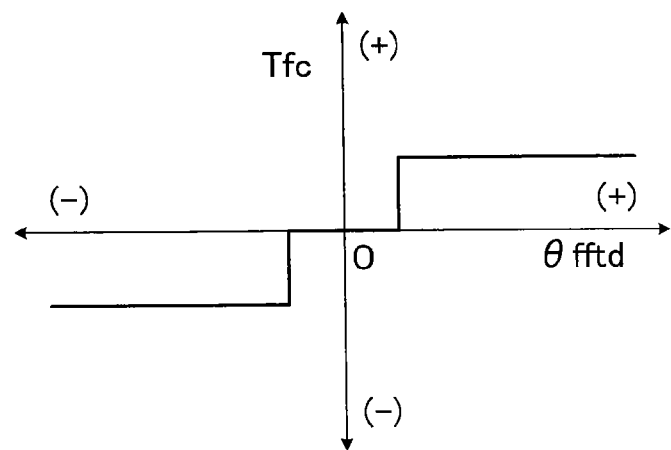
FIG. 12 is a map for calculating an assist torque Tfc for compensating friction in the electric power steering unit and the like on the basis of the differential value θfftd of the final target steered angle θfft of the front wheels.

In steps 340, an assist torque Tfc for compensating friction in the steering system and the electric power steering unit 22 is calculated from a map shown in FIG. 12 on the basis of the differential value θfftd of the final target steered angle θfft of the front wheels.

In steps 350, a target steered angle θft of the front wheels for trajectory control is processed by a filter of second order delay and second order advance to calculate a response-corrected target steered angle θftf of the front wheels. For example, a response-corrected target steered angle θftf of the front wheels is calculated in accordance with the following Formula 1. In the Formula 1, s represents a Laplace operator and a0-a2 and b0-b2 are coefficients determined by the specification of the vehicle and the like.

$$\theta ftf = \frac{a2s^2 + a1s + a0}{b2s^2 + b1s + b0} \theta ft \quad (1)$$

Figure 13:
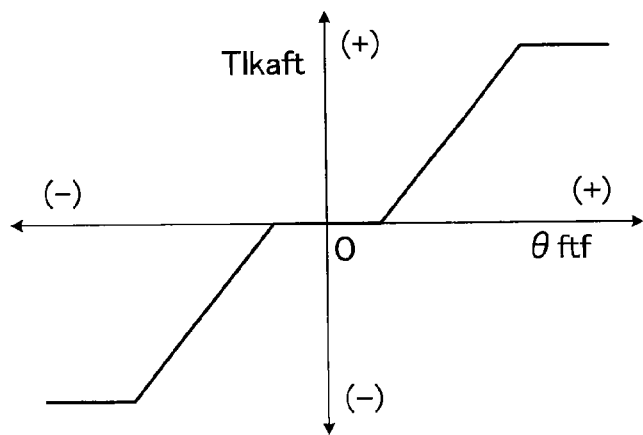
FIG. 13 is a map for calculating a correction torque Tlkaft based on the steered angle control of the front wheels on the basis of the response-corrected target steered angle θftf of the front wheels.

In steps 360, a correction torque Tlkaft based on the steered angle control of the front wheels is calculated from a map shown in FIG. 13 on the basis of the response-corrected target steered angle θftf of the front wheels. The correction torque Tlkaft is an assist torque for controlling the steered angle of the front wheels to the target steered angle θft for the purpose of the trajectory control.

In steps 370, a target steered angle θrt of the rear wheels for trajectory control is processed by a filter of second order delay and first order advance to calculate a response-corrected target steered angle θrtf of the rear wheels. For example, a response-corrected target steered angle θrtf of the rear wheels is calculated in accordance with the following Formula 2. In the Formula 2, s represents a Laplace operator and b0-b2 and c0-c2 are coefficients determined by the specification of the vehicle and the like.

$$\theta rtf = \frac{c1s + c0}{b2s^2 + b1s + b0} \theta rt \quad (2)$$

Figure 14:
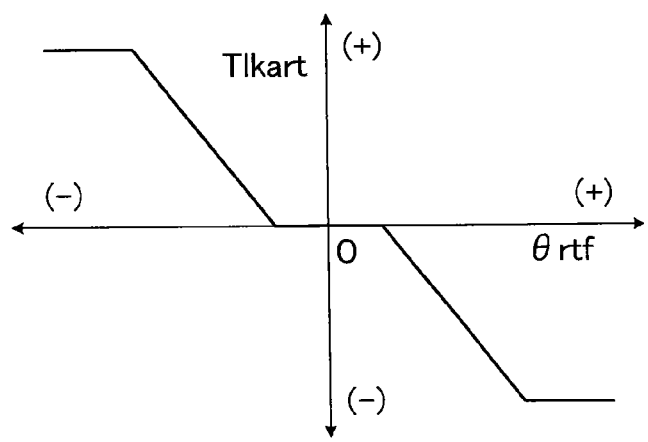
FIG. 14 is a map for calculating a correction torque Tlkart based on the steered angle control of the rear wheels on the basis of the response-corrected target steered angle θrtf of the rear wheels.

In steps 380, a correction torque Tlkart based on the steered angle control of the rear wheels is calculated from a map shown in FIG. 14 on the basis of the response-corrected target steered angle θrtf of the rear wheels. The correction torque Tlkart is an assist torque for controlling the steered angle of the rear wheels to the target steered angle θrt for the purpose of the trajectory control.

In steps 390, a sum of the torques Tic, Tdc, Tfc, Tlkaft and Tlkart calculated in step 320-340, 360 and 380 is calculated as a target assist torque Tlkat based on the trajectory control and a signal indicative of the value is output to the steering assist torque control block 500.

<Steering Assist Torque Control Routine>

Figure 15:
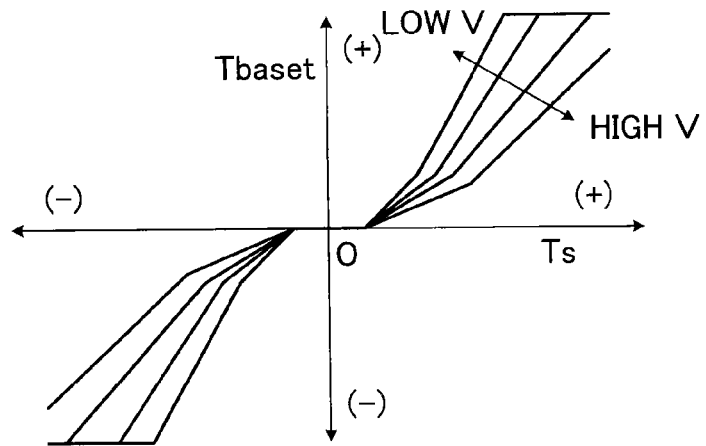
FIG. 15 is a map for calculating a target basic assist torque Tbaset for reducing steering burden on the driver on the basis of steering torque Ts and vehicle speed V.

In step 410 in the steering assist torque control routine shown in FIG. 6, a target basic assist torque Tbaset for reducing steering burden on the driver is calculated from a map shown in FIG. 15 on the basis of steering torque Ts and vehicle speed V.

In steps 420, a sum of the target basic assist torque Tbaset and the target assist torque Tlkat based on the trajectory control is calculated as a final target assist torque Tfat.

In steps 430, the electric power steering unit 22 is controlled so that steering assist torque Ts conforms to the final target assist torque Tfat.

As is understood from the above, in the trajectory control block 100, a target steered angle θlkaft of the front wheels and a target steered angle θlkart of the rear wheels for making the vehicle travel along the target trajectory are calculated. In the steering wheel rotation control block 200, a target correction amount Δθsft of the steered angle of the front wheels for rotating the steering wheel 20 is calculated which is to be used to announce change in travelling direction of the vehicle prior to actual change in travelling direction of the vehicle caused by the trajectory control.

The target correction amount Δθsft and the target steered angle θft (=θlkaft) of the front wheel are summed by the adder 310 to calculate a final target steered angle θfft of the front wheels. The steered angle varying unit 14 is controlled so that steered angle θf the front wheels conforms to the final target steered angle θfft. In addition, target steered angle θrt (=θlkart) of the rear wheels is set to a final target steered angle θfrt and steered angle θr of the rear wheels is controlled so that it conforms to the final target steered angle θfrt.

In the steering reaction force control block 400, a target assist torque Tlkat for controlling the steered angle θf of the front wheels to the target steered angle θlkaft of the trajectory control without rotating the steering wheel 20 is calculated. In the steering assist torque control block 500, a sum of a target basic assist torque Tbaset for reducing steering burden on the driver and the target assist torque Tlkat is calculated as a final target assist torque Tfat. In addition, the electric power steering unit 22 is controlled so that steering assist torque conforms to the final target assist torque Tfat.

Accordingly, while steered angle θr of the rear wheels is controlled so that it conforms to the final target steered angle θfrt which is the same as the target steered angle θlkart of the rear wheels of the trajectory control, the steered angle θf the front wheels is controlled so that it conforms to the final target steered angle θfft which is the sum of the target steered angle θlkaft for the trajectory control and the target correction amount Δθsft. In addition, the electric power steering unit 22 is controlled so that it achieves a target assist torque Tlkat which enables to control the steered angles of the front and rear wheels to the target steered angles θlkaft and θlkart, respectively, for the trajectory control without rotating the steering wheel 20 in cooperation with the steered angle varying unit 14.

Thus, the steered angles of the front and rear wheels can be controlled to the target steered angles θlkaft and θlkart, respectively, for the trajectory control to make the vehicle travel along the target trajectory, and the steering wheel 20 can be rotated by the target rotation angle θswt which corresponds to the target correction amount Δθsft of the steered angle of the front wheels. Therefore, it is possible to announce the change of the vehicle travel direction by the rotation of the steering wheel 20 prior to the vehicle travel direction being actually changed by the trajectory control.

Figure 16:
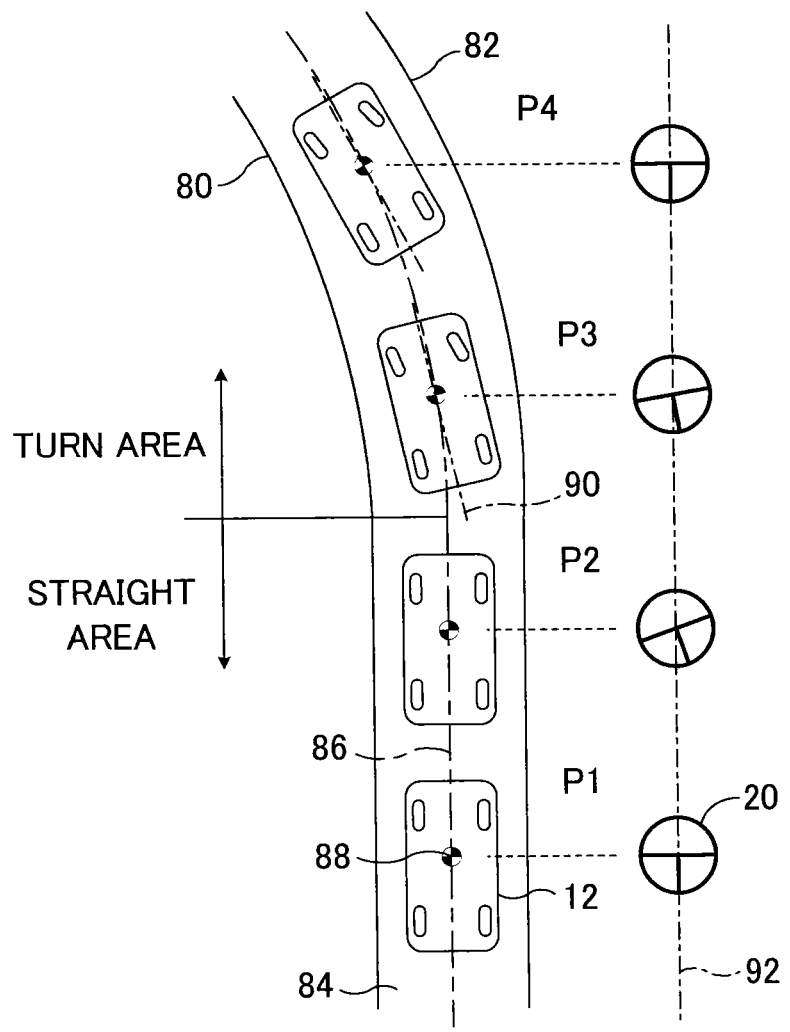
FIG. 16 is an illustration showing the operation of the first embodiment with regard to a case where a vehicle travels along a road which varies from straight to left turn.

For example, FIG. 16 is an illustration showing the operation of the first embodiment with regard to a case where a vehicle travels along a lane which varies from straight to left turn.

In FIGS. 16, 80 and 82 represent left and right white lines of a lane 84, respectively and 86 represents a target trajectory which is formed by connecting the mid positions between the left and right white lines 80 and 82. 88 represents a reference position of the vehicle 12 which may be, for example, a gravity center and 90 represents longitudinal direction of the vehicle. In addition, in FIG. 16, 92 represents a neutral direction of the steering wheel 20 so as to clearly indicate the rotation positions of the steering wheel 20 when the vehicle 12 is at travel positions P1-P4.

When the vehicle 12 runs straight (travel position P1), the target steered angle θlkaft of the front wheels and the target steered angle θlkart of the rear wheels are 0 and the target correction amount Δθsft of the steered angle of the front wheels is also 0. Accordingly, steered angle θf the front wheels and steered angle θr of the rear wheels are controlled to 0 corresponding to the positions which make the vehicle travel straight, and the steering wheel 20 is kept at its neutral position.

When the vehicle 12 approaches the turn area (travel position P2), although the target steered angle θlkaft of the front wheels and the target steered angle θlkart of the rear wheels are 0, the target correction amount Δθsft of the steered angle of the front wheels becomes a value for left turn. Accordingly, while steered angle θf the front wheels and steered angle θr of the rear wheels are controlled to 0 corresponding to the positions which make the vehicle travel straight, the steering wheel 20 is turned in left turn direction by a target rotation angle θswt, which announces the occupants in the vehicle that the vehicle will be made turn left by the trajectory control.

When the vehicle 12 enters into the turn area (travel position P3), the target steered angle θlkaft of the front wheels and the target steered angle θlkart of the rear wheels assume values for left turn which are determined according to curvature R of the target trajectory 86, and the target correction amount Δθsft of the steered angle of the front wheels and target rotation angle θswt gradually decrease to near 0. Accordingly, steered angle θf the front wheels and steered angle θr of the rear wheels are controlled to values for left turn and the steering wheel 20 is returned from a left turn position to the near neutral position, which announce the occupants in the vehicle that the left turning condition of the vehicle will not be altered by the trajectory control.

When the vehicle 12 becomes steadily turning left (travel position P4), the target steered angle θlkaft of the front wheels and the target steered angle θlkart of the rear wheels are kept at values for left turn which are determined according to curvature R of the target trajectory 86, and the target correction amount Δθsft of the steered angle of the front wheels and target rotation angle θswt are kept at near 0. Accordingly, steered angle θf the front wheels and steered angle θr of the rear wheels are controlled to values for left turn and the steering wheel 20 is kept at the near neutral position, which announce the occupants in the vehicle that the present left turning condition of the vehicle will be maintained.

Second Embodiment

Figure 17:
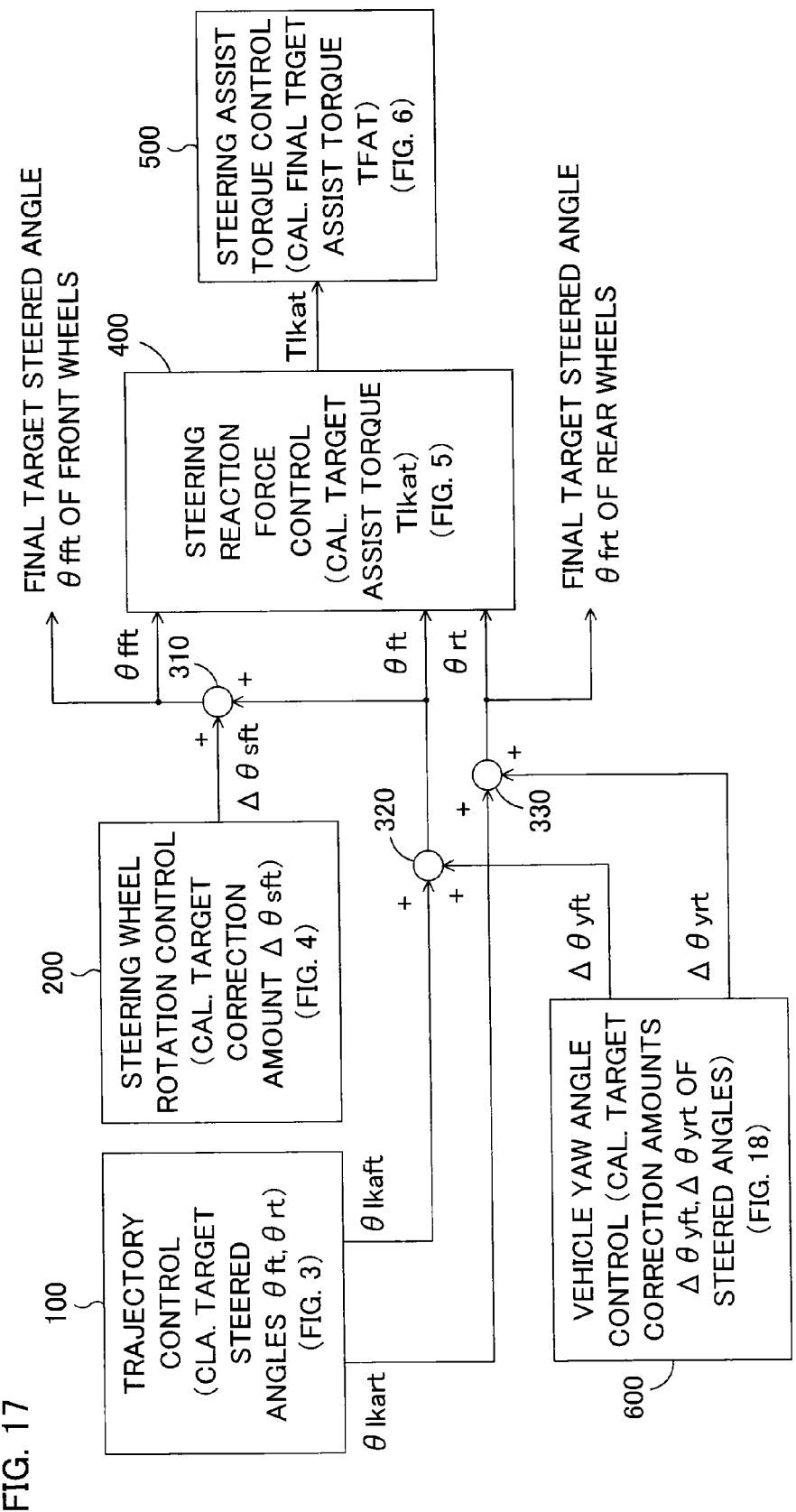
FIG. 17 is a block diagram illustrating the entire of the vehicle drive-control in the second embodiment of the vehicle drive-control device according to the present invention.

FIG. 17 is a block diagram illustrating the entire of the vehicle drive-control in the second embodiment of the vehicle drive-control device according to the present invention. In FIG. 17, the blocks corresponding to those shown in FIG. 2 are denoted by the same reference numbers as in FIG. 2.

In the second embodiment, a vehicle yaw angle control block 600 is provided in addition to the trajectory control block 100, the steering wheel rotation control block 200, the steering reaction force control block 400 and the steering assist torque control block 500. It is to be noted that the control in each of the blocks other than the vehicle yaw angle control block 600 is the same as that in the above-described first embodiment.

Figure 18:
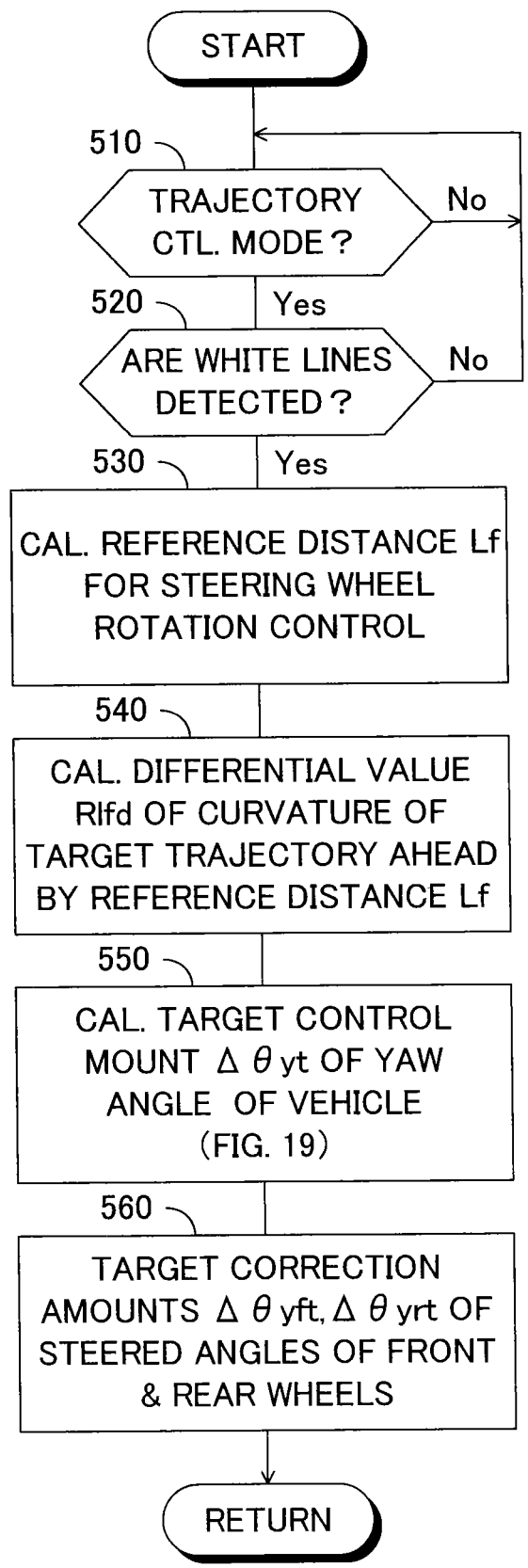
FIG. 18 is a flowchart showing the control routine in the vehicle yaw angle control block shown in FIG. 17.

The control in the vehicle yaw angle control block 600 is executed in accordance with the flowchart shown in FIG. 18 by the vehicle drive-control section of the electronic control unit 16. Target correction amounts Δθyft and Δθyrt of the steered angles of the front and rear wheels are calculated which are used to control yaw angle φ of the vehicle by the trajectory control and to announce the occupants in the vehicle that the yaw angle will change, and signals indicative of the values are output to adders 320 and 330.

The target correction amount Δθyft of the steered angle of the front wheels is added by the adder 320 with a target steered angle θlkaft of the front wheels to calculate a target steered angle θft of the front wheels. A signal indicative of the target steered angle θft of the front wheels is output to the adder 310 and is also output to the steering reaction force control block 400.

In similar, the target correction amount Δθyrt of the steered angle of the rear wheels is added by the adder 330 with a target steered angle θlkart of the rear wheels to calculate a target steered angle θrt of the rear wheels. A signal indicative of the target steered angle θrt of the rear wheels is output to the steering reaction force control block 400 and is also output as a signal indicative of a final target steered angle θfrt of the rear wheels to the steering angle control section of the electronic control unit 16.

<Vehicle Yaw Angle Control Routine>

Steps 510 to 540 in the vehicle yaw angle control routine shown in FIG. 18 are conducted in the same manners as in step 210 to 240, respectively, in the above-described steering wheel rotation control routine.

Figure 19:
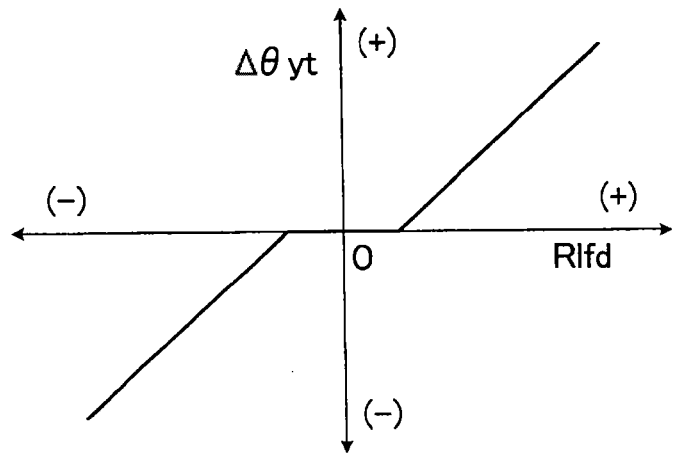
FIG. 19 is a map for calculating a target control amount Δθyt of vehicle yaw angle on the basis of a changing rate R1fd of the curvature R of the target trajectory.

In step 550, a target control amount Δθyt of vehicle yaw angle for announcing the occupants in the vehicle about the change in vehicle travel direction by the vehicle trajectory control is calculated from a map shown in FIG. 19 on the basis of a changing rate R1fd of the curvature R of the target trajectory.

In step 560, target correction amounts Δθyft and Δθyrt of the steered angles of the front and rear wheels are calculated by, for example, filtering the target control amount Δθyt of vehicle yaw angle with a filter of first order advance, and signals indicative of the value are output to the adders 320 and 330. Target correction amounts Δθyft and Δθyrt of the steered angles of the front and rear wheels may be calculated in accordance with the following Formulae 3 and 4. In the Formulae, s represents a Laplace operator and time constants Kf and Kr are constants determined by the specification of the vehicle and the like.

$$\Delta\theta yft = -(Kfs+1)\Delta\theta yt \quad (3)$$

$$\Delta\theta yrt = -(Krs+1)\Delta\theta yt \quad (4)$$

It is to be understood that the vehicle yaw angle control routine shown in FIG. 18 may be integrated with the steering wheel rotation control routine shown in FIG. 4. For example, the routine may be modified such that steps 550 and 560 are conducted after completion of step 250 shown in FIG. 4.

As is understood from the above, in the second embodiment, the control in each of the blocks other than the vehicle yaw angle control block 600 is conducted in the same manner as in the above-described first embodiment. Target correction amounts Δθyft and Δθyrt of the steered angles of the front and rear wheels which are used to control yaw angle φ of the vehicle by the trajectory control are calculated by the control in the vehicle yaw angle control block 600.

The target correction amount Δθyft of the steered angle of the front wheels is added by the adder 320 with a target steered angle θlkaft of the front wheels, and signals indicative of the target steered angle θft of the front wheels calculated by the addition are output to the adder 310 and the steering reaction force control block 400. In similar, the target correction amount Δθyrt of the steered angle of the rear wheels is added by the adder 330 with a target steered angle θlkart of the rear wheels, a signal indicative of the target steered angle θrt of the rear wheels calculated by the addition is output to the steering reaction force control block 400 and is also output as a signal indicative of a final target steered angle θfrt of the rear wheels to the steering angle control section of the electronic control unit 16.

Accordingly, the steered angle θf of the front wheels is controlled so that it conforms to the final target steered angle θfft which is the sum of the target steered angle θlkaft for the trajectory control, the target correction amount Δθyft for the yaw angle control and the target correction amount Δθsft for steering wheel rotation angle control. The steered angle θr of the rear wheels is controlled so that it conforms to the final target steered angle θfrt which is the sum of the target steered angle θlkaft of the rear wheels of the trajectory control and the target correction amount Δθyrt for the yaw angle control. In addition, the electric power steering unit 22 is controlled so that it achieves a target assist torque Tlkat which enables to control the steered angles of the front and rear wheels to the target steered angle θft and θrt, respectively, which are the sum of the target steered angle of the front and rear wheels for the trajectory control and the target correction amount for yaw angle control, without rotating the steering wheel 20 in cooperation with the steered angle varying unit 14.

Thus, the steered angles of the front and rear wheels can be controlled to make the vehicle travel along the target trajectory with yaw angle of the vehicle being controlled, and the steering wheel 20 can be rotated by the target rotation angle θswt which corresponds to the target correction amount Δθsft of the steered angle of the front wheels. Therefore, it is possible to announce the occupants in the vehicle that the vehicle travel direction will be changed by the rotation of the steering wheel 20 and the yaw angle of the vehicle prior to the vehicle travel direction being actually changed by the trajectory control. Thus, announcement which is more effective than that in the first embodiment can be performed.

Figure 20:
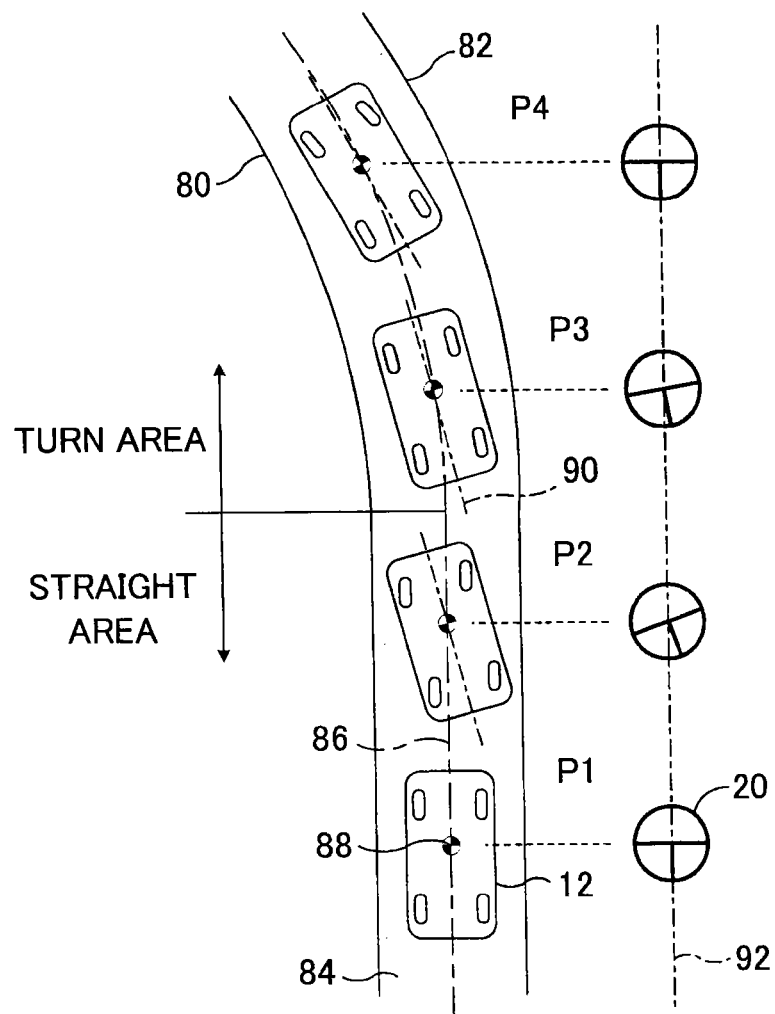
FIG. 20 is an illustration showing the operation of the second embodiment with regard to a case where a vehicle travels along a road which varies from straight to left turn.

For example, FIG. 20 is an illustration showing the operation of the second embodiment with regard to a case where a vehicle travels along a lane which varies from straight to left turn. It is to be noted that in FIG. 20, the parts corresponding to those shown in FIG. 16 are denoted by the same reference numbers as in FIG. 16.

When the vehicle 12 runs straight (travel position P1), the target steered angles θlkaft and θlkart of the front and rear wheels are 0; the target correction amounts Δθyft and Δθyft of the front and rear wheels for the yaw angle control are 0; and the target correction amount Δθsft of the steered angle of the front wheels is also 0. Accordingly, steered angle θf of the front wheels and steered angle θr of the rear wheels are controlled to 0 corresponding to the positions which make the vehicle travel straight; the steering wheel 20 is kept at its neutral position; and the yaw angle of the vehicle is maintained at 0.

When the vehicle 12 approaches the turn area (travel position P2), although the target steered angle θlkaft of the front wheels and the target steered angle θlkart of the rear wheels are 0, the target correction amounts Δθyft and Δθyft of the front and rear wheels for the yaw angle control assume values which make the yaw angle of the vehicle leftward and the target correction amount Δθsft of the steered angle of the front wheels assumes a value for left turn. Accordingly, while steered angle θf the front wheels and steered angle θr of the rear wheels are controlled to values which make the vehicle turn right and left, respectively, resulting in that the yaw angle of the vehicle is controlled toward left and the steering wheel 20 is turned in left turn direction by a target rotation angle θswt. Therefore, by means of the yaw angle of the vehicle and the rotation of the steering wheel 20, the occupants in the vehicle are announced that the vehicle will be made turn left by the trajectory control.

When the vehicle 12 enters into the turn area (travel position P3), the target steered angle θlkaft of the front wheels and the target steered angle θlkart of the rear wheels assume values for left turn which are determined according to curvature R of the target trajectory 86. The target correction amount Δθsft of the steered angle of the front wheels and target rotation angle θswt gradually decrease to near 0. Accordingly, steered angle θf the front wheels and steered angle θr of the rear wheels are gradually reduced from values for right turn and left turn, respectively and the steering wheel 20 is returned from a left turn position to the near neutral position, which announce the occupants in the vehicle that the left turning condition of the vehicle will not be altered by the trajectory control.

When the vehicle 12 becomes steadily turning left (travel position P4), the target steered angle θlkaft of the front wheels and the target steered angle θlkart of the rear wheels are kept at values for left turn which are determined according to curvature R of the target trajectory 86. The target correction amounts Δθyft and Δθyft of the front and rear wheels for the yaw angle control, the target correction amount Δθsft of the steered angle of the front wheels and the target rotation angle θswt are kept at 0. Accordingly, steered angle θf the front wheels and steered angle θr of the rear wheels are controlled to values for left turn and the steering wheel 20 is kept at the near neutral position, which announce the occupants in the vehicle that the present left turning condition of the vehicle will be maintained.

Third Embodiment

In the third embodiment, the control in each of the blocks other than the trajectory control block 100 shown in FIG. 17 is conducted in the same manner as in the above-described second embodiment. That is, the controls in the steering wheel rotation control block 200, the steering reaction force control block 400 and the steering assist torque control block 500 and the vehicle yaw angle control block 600 are conducted in the same manners as in the above-described second embodiment.

Figure 21:
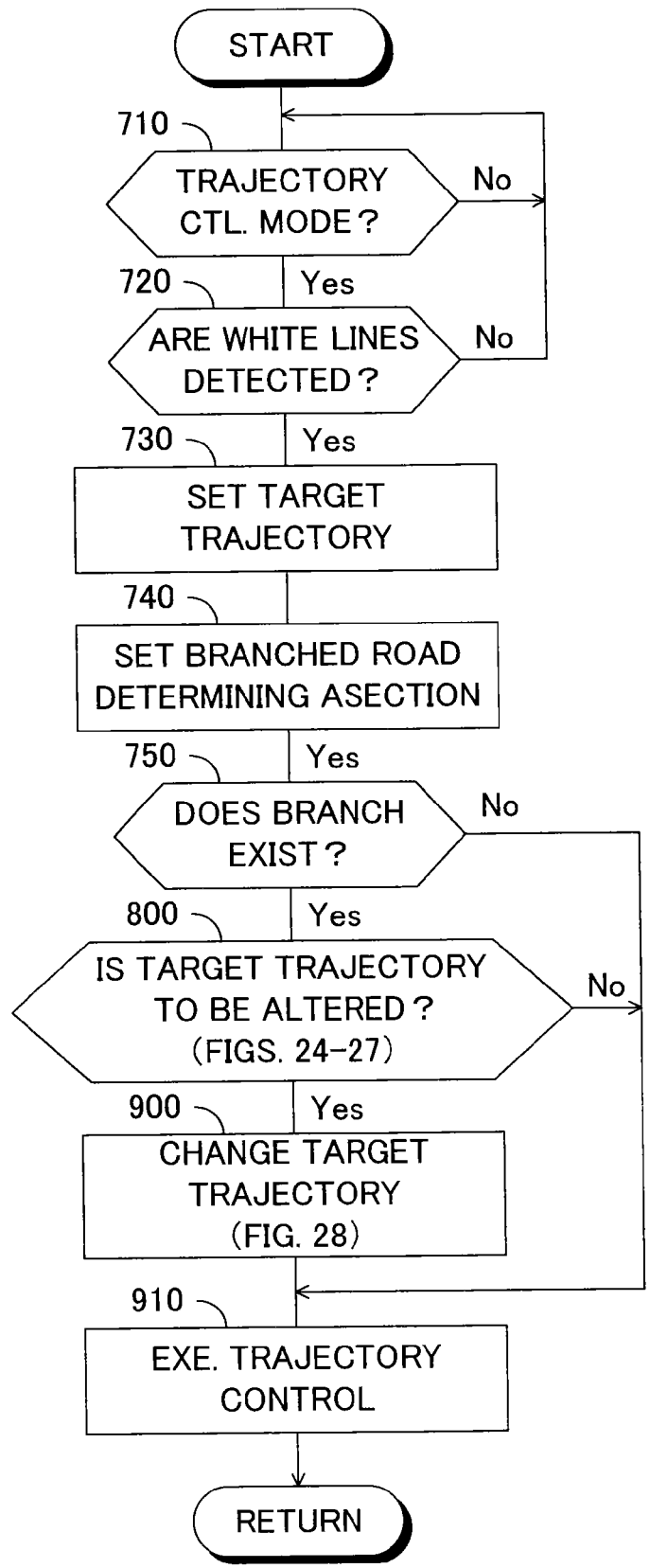
FIG. 21 is a flowchart showing the trajectory control routine in the third embodiment of the vehicle drive-control device according to the present invention.

The control in the trajectory control block 100 is executed in accordance with the flowchart shown in FIG. 21 by the vehicle drive-control section of the electronic control unit 16. In the vehicle trajectory control, a target trajectory of the vehicle is set and a decision is made whether or not the lane which is along the target trajectory is branched. When a decision is made that the lane is branched, a decision is made whether or not the target trajectory is to be altered by the determination of the intention of the driver concerning alteration of the running course. Furthermore, when a decision is made that the target trajectory should be altered, it is altered to a trajectory which is along a running course desired by the driver. It is to be noted that a branched lane in the present application means a lane where running course is branched into a plurality of running courses such as Y-shaped road, crossing road and the like.

Figure 22:
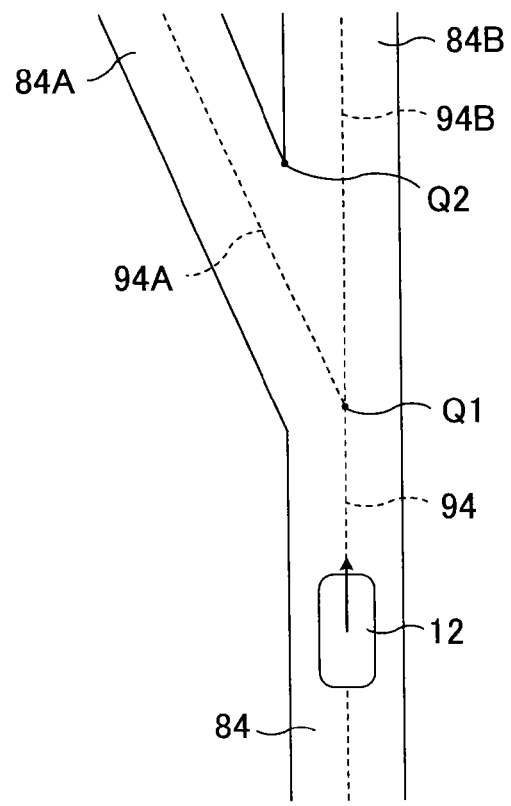
FIG. 22 shows an example of a branched road which is branched in Y-shape.

FIG. 22 shows an example of a branched lane (Y-shaped road). In the branched lane shown in FIG. 22, a running course 94 of a lane 84 is branched in Y-shape at a branch point Q1 into a running course 94A of a lane 84A and a running course 94B of a lane 84B. Point Q2 represents a final point of the branch, i.e. the point ahead of which the vehicle cannot change its running course. In the following description, it is assumed that the running courses 94 and 94A are present target trajectory and when a decision is made that the target trajectory should be altered, it is altered to the running course 94B.

Figure 23:
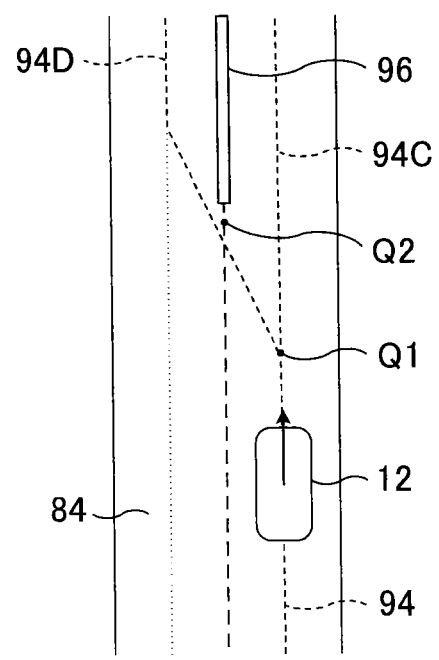
FIG. 23 shows an example of a branched road where a running course is branched within the road.

FIG. 23 shows an example of a branched road where a running course is branched within the road. In the branched road shown in FIG. 23, the lane 84 has two running courses, which are partially separated by a median strip 96, and the running course 94 is branched at a branch point Q1 into running courses 94C and 94D. It is to be noted that the position of branch point Q1 varies according to vehicle speed V, width of the road and the like and a final point Q2 of the branch is determined by the position of the near end of the median strip 96.

In the third embodiment, when a decision is made that the road is branched, the lateral position of the vehicle is shifted to make the vehicle approach a running course which is nearer to the present target trajectory among the plurality of running courses ahead of the branch point. A decision is made whether or not the driver has an intension to alter the running course on the basis of the driving operation conducted by the driver against the above lateral shift of the vehicle. When a decision is made that the driver has an intension to alter the running course, it is determined that the target trajectory should be altered on the basis of the decision.

<Trajectory Control Routine>

Steps 710 and 720 in the trajectory control routine shown in FIG. 21 are conducted in the same manner as in step 110 and 120, respectively, in the trajectory control routine (FIG. 3) in the above-described first embodiment. However, when an affirmative decision is made in step 720, the control proceeds to step 730.

In step 730, a lane ahead of the vehicle is determined by analysis and the like of the forward image information captured by CCD camera 58. A target trajectory is set on the basis of the determined lane and a target route set by a navigation unit and the like.

In step 740, a branched road determining section which is used to decide whether or not a branch exists in the road ahead of the vehicle is set to a section located, for example, between a position spaced ahead by Lmin and a position spaced ahead by Lmax from the present position. Lmin and Lmax are variably set on the basis of vehicle speed V so that they increase as vehicle speed V increases. It is to be noted that Lmax is set to a value which is larger than a length of the under-described driver's intension determining section and Lmin is set to a value which is smaller than Lmax.

In step 750, a decision is made as to whether or not a branch exists in the branched road determining section on the basis of the analysis results of forward image information captured by CCD camera 58 and information sent from a navigation unit and the like. When a negative decision is made, as the target trajectory is not to be altered, the control proceeds to step 910, whereas when an affirmative decision is made, the control proceeds to step 800. It is to be noted that if a decision has already been made that a branch exists, the control proceeds to step 800 without conducting the decision as to existence of a branch in step 750.

In step 800, a decision is made as to whether or not the target trajectory is to be altered in accordance with the flowcharts shown in FIGS. 24 to 27. When a negative decision is made, the control proceeds to step 910, whereas when an affirmative decision is made, the control proceeds to step 900. It is to be noted that if a decision has already been made that the target trajectory is to be altered, the control proceeds to step 910 without conducting the decision as to necessity of alteration in step 800.

Figure 28:
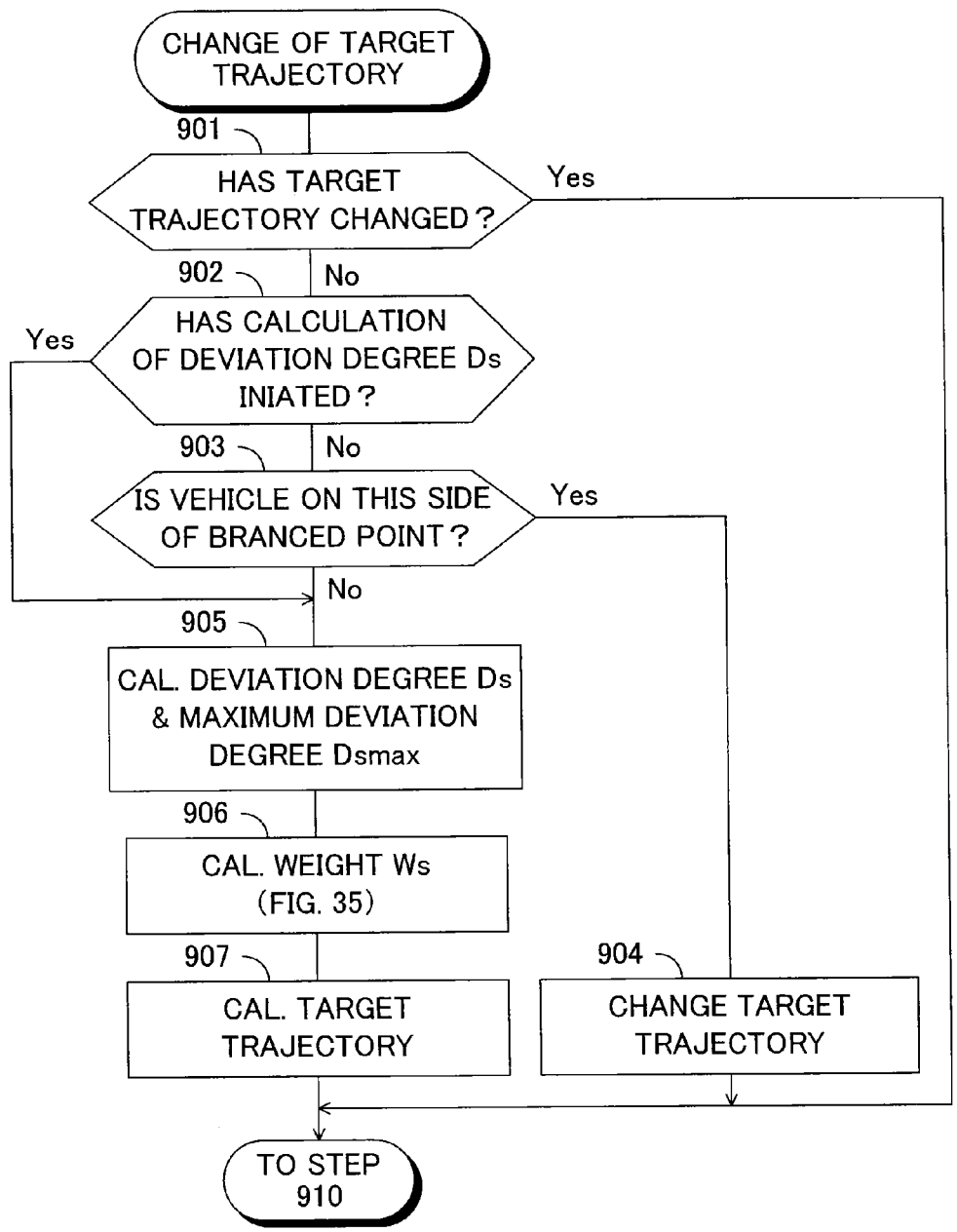
FIG. 28 is a flowchart showing the control routine for changing the target trajectory in the third embodiment.

In step 900, the target trajectory is changed to another trajectory branched from the present trajectory in accordance with the flowchart shown in FIG. 28. For example, in the branched road shown in FIG. 22, the target trajectory is changed from the trajectory of the running course 94A to the trajectory of the running course 94B.

In step 910, a target steered angle θlkaft of the front wheels and a target steered angle θlkart of the rear wheels for making the vehicle trajectory conform to the target trajectory are calculated, and a target rotation angle θswt of the steering wheel 20 is calculated. The target steered angles θlkaft and θlkart and the target rotation angle θswt may be calculated in the same manners as in the first and second embodiment or may be calculated in any other manners. The steered angle varying unit 14 and the electric power steering units 22 and 44 are controlled so that steered angles θf and θr of the front and rear wheels conforms to the final target steered angles θfft and θfrt, respectively, which control the vehicle to travel along the target trajectory.

<Control Routine for Deciding Necessity of Altering Target Trajectory>

Figure 29:
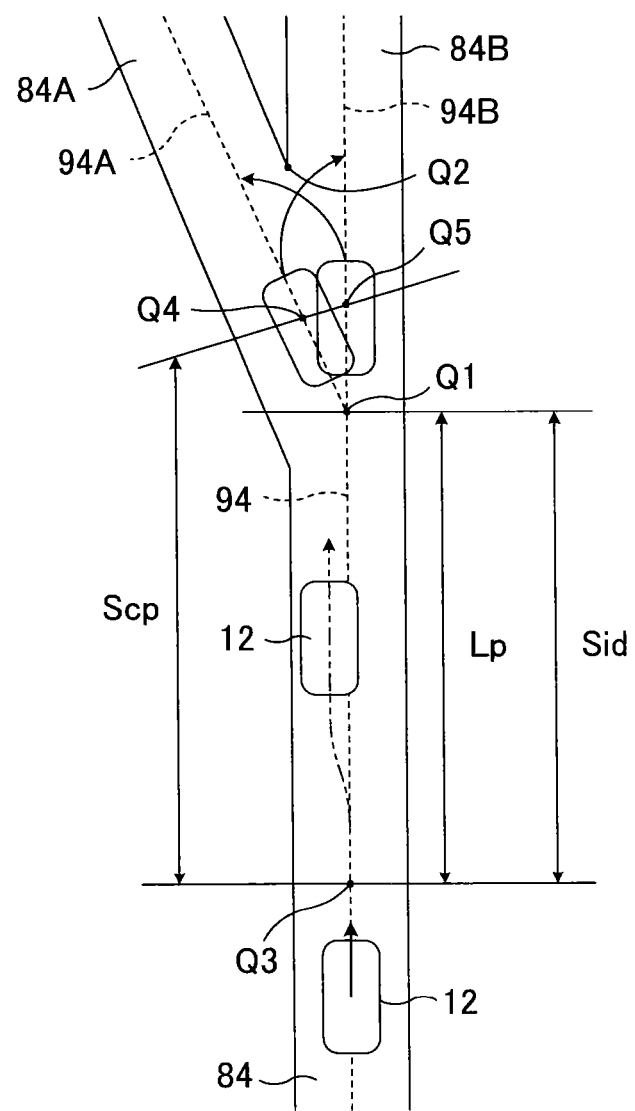
FIG. 29 is an explanatory view with respect to a section for allowing alteration of the target trajectory and a described driver's intension determining section.

Before describing the routine for deciding the necessity of altering the target trajectory, taking a branched road shown in FIG. 22 for example and referring to FIG. 29, explanations are given concerning settings of a section for allowing alteration of the target trajectory and a section for deciding intension of a driver.

As shown in FIG. 29, a position Q3 which is spaced by a distance Lp on this side of the branch point Q1 is set to a start point of a section Scp for allowing alteration of the target trajectory and a section Sid for deciding intension of the driver. The branch point Q1 is set to an end point of the section Sid for deciding intension of the driver. Again as shown in FIG. 29, if the vehicle 12 passes the branch point Q1 far ahead, the running course alteration cannot be achieved on this side of the end point Q2 of the branch from the running course 94A to the running course 94B or vice versa. The points Q4 and Q5 which are farthest from the branch point Q1 in the area where the running course alteration is allowed are referred to an end point of the section Scp for allowing alteration of the target trajectory. It is to be noted that the distance Lp is variably set so that it increases as vehicle speed v increases. The end points Q4 and Q5 of the section Scp for allowing alteration of the target trajectory are variably set so that they approaches the branch point Q1 as vehicle speed v increases, the angle between branched lanes increases and the width of the lane increases.

Figure 24:
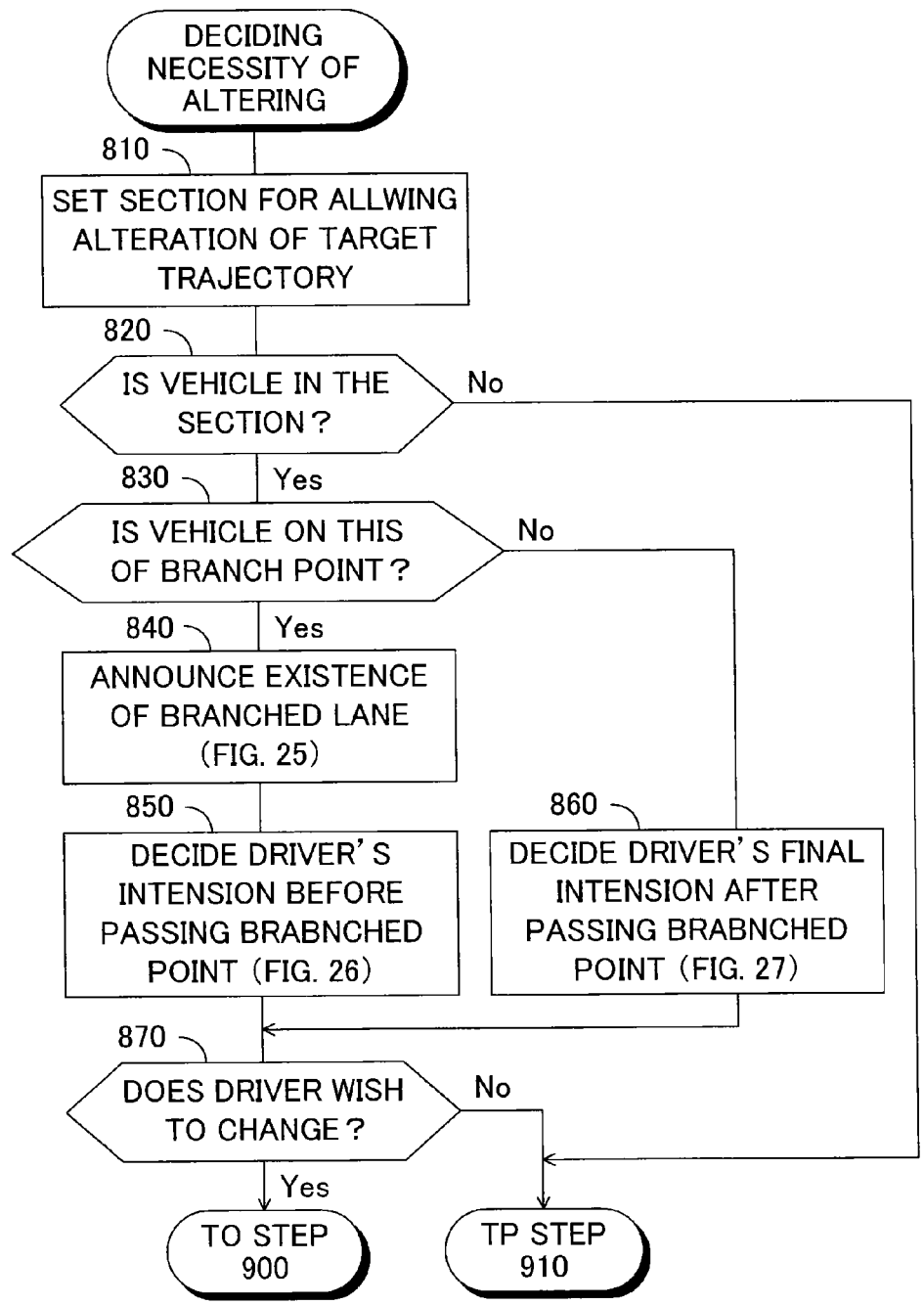
FIG. 24 is a flowchart showing the control routine for deciding the necessity of altering the target trajectory in the third embodiment.

Next, referring to the flowchart shown in FIG. 24, the control routine for deciding the necessity of altering the target trajectory conducted in step 800.

First, in step 810, a section for allowing alteration of the target trajectory is set if any section for allowing alteration of the target trajectory has not been set. The section for allowing alteration of the target trajectory is a section where a target trajectory can be altered and alteration of a target trajectory is prohibited in areas on this side of and ahead of the section.

In step 820, a decision is made as to whether or not the vehicle is in the section Scp for allowing alteration of the target trajectory. When a negative decision is made, as alteration of a target trajectory is not allowed, the control proceeds to step 910, whereas when an affirmative decision is made, the control proceeds to step 830.

In step 830, a decision is made as to whether or not the vehicle is on this side of the branch point Q1, i.e. whether or not the vehicle is in the section Sid for deciding intension of the driver. When a negative decision is made, the control proceeds to step 860, whereas when an affirmative decision is made, the control proceeds to step 840.

Figure 25:
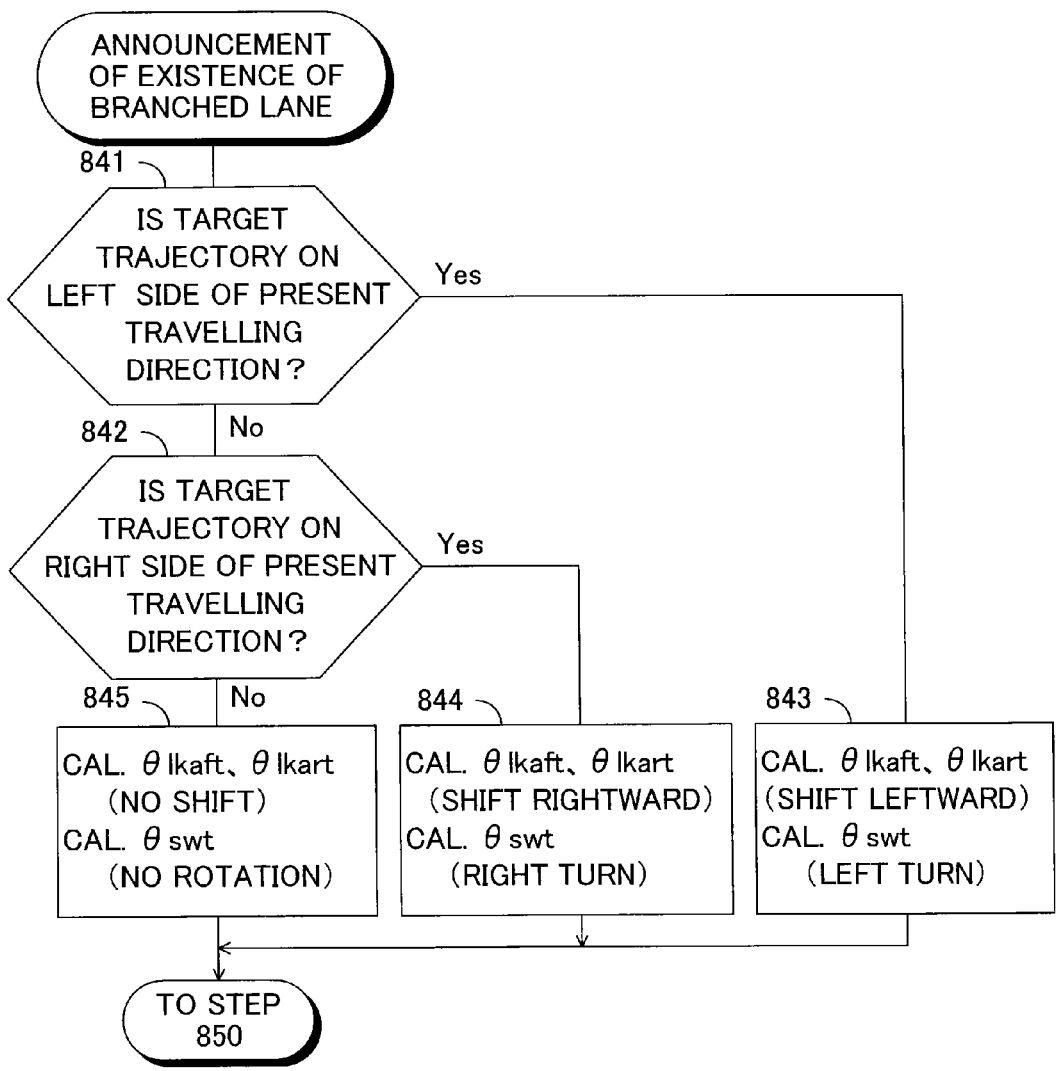
FIG. 25 is a flowchart showing the control routine for giving advance notice of the existence of a branch of a road in the third embodiment.

In step 840, the lateral position and the like of the vehicle relative to the lane are varied based on the present target trajectory in accordance with the flowchart shown in the under-described FIG. 25, which announces the occupants in the vehicle that a branched lane exists.

Figure 26:
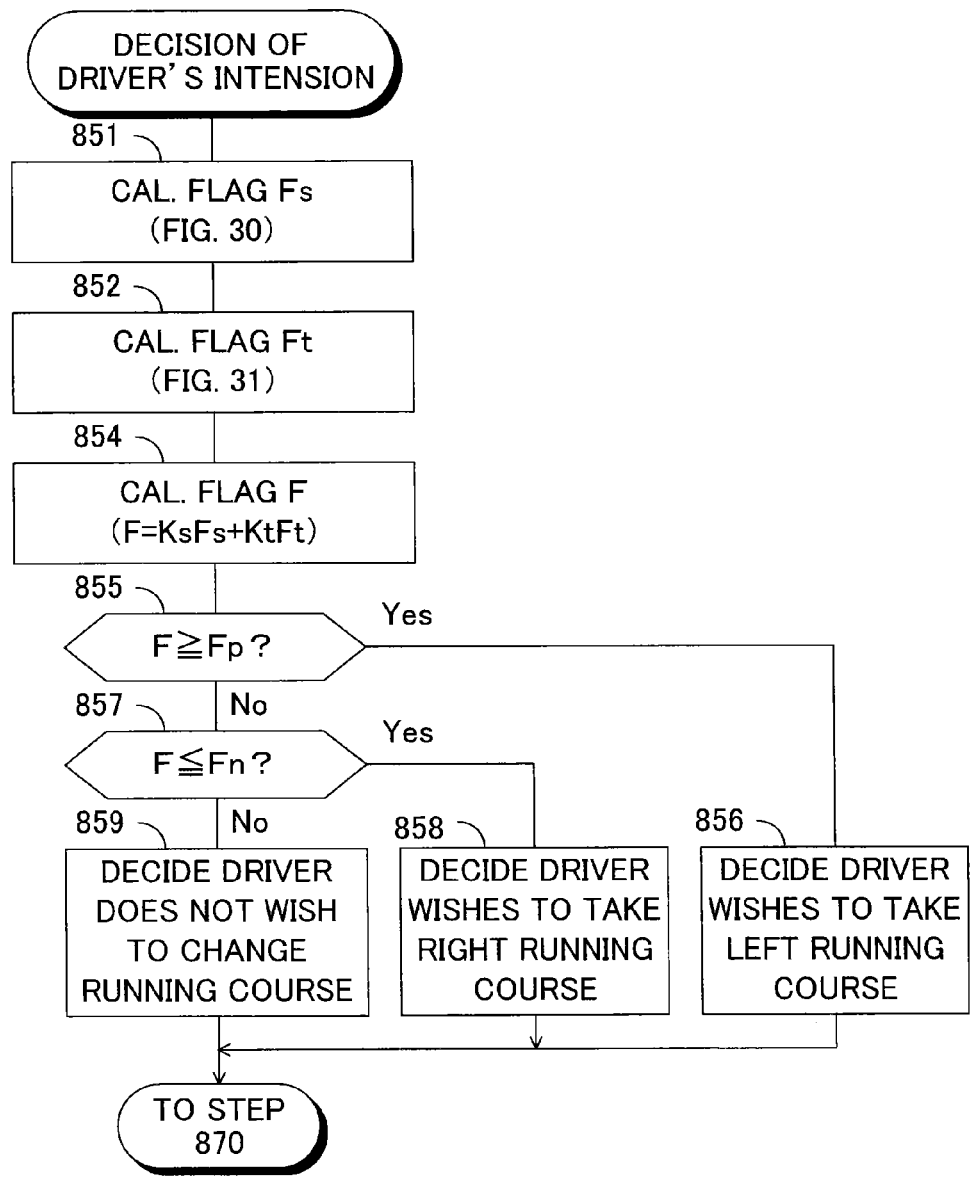
FIG. 26 is a flowchart showing the control routine for deciding the driver's intension concerning change of running course in the third embodiment.

In step 850, in the situation where the vehicle has not yet passed the branch point Q1, a decision is made as to the driver's intension concerning selection of running course in accordance with the flowchart shown in the under-described FIG. 26. That is, a decision is made as to which running course the driver wishes to take.

Figure 27:
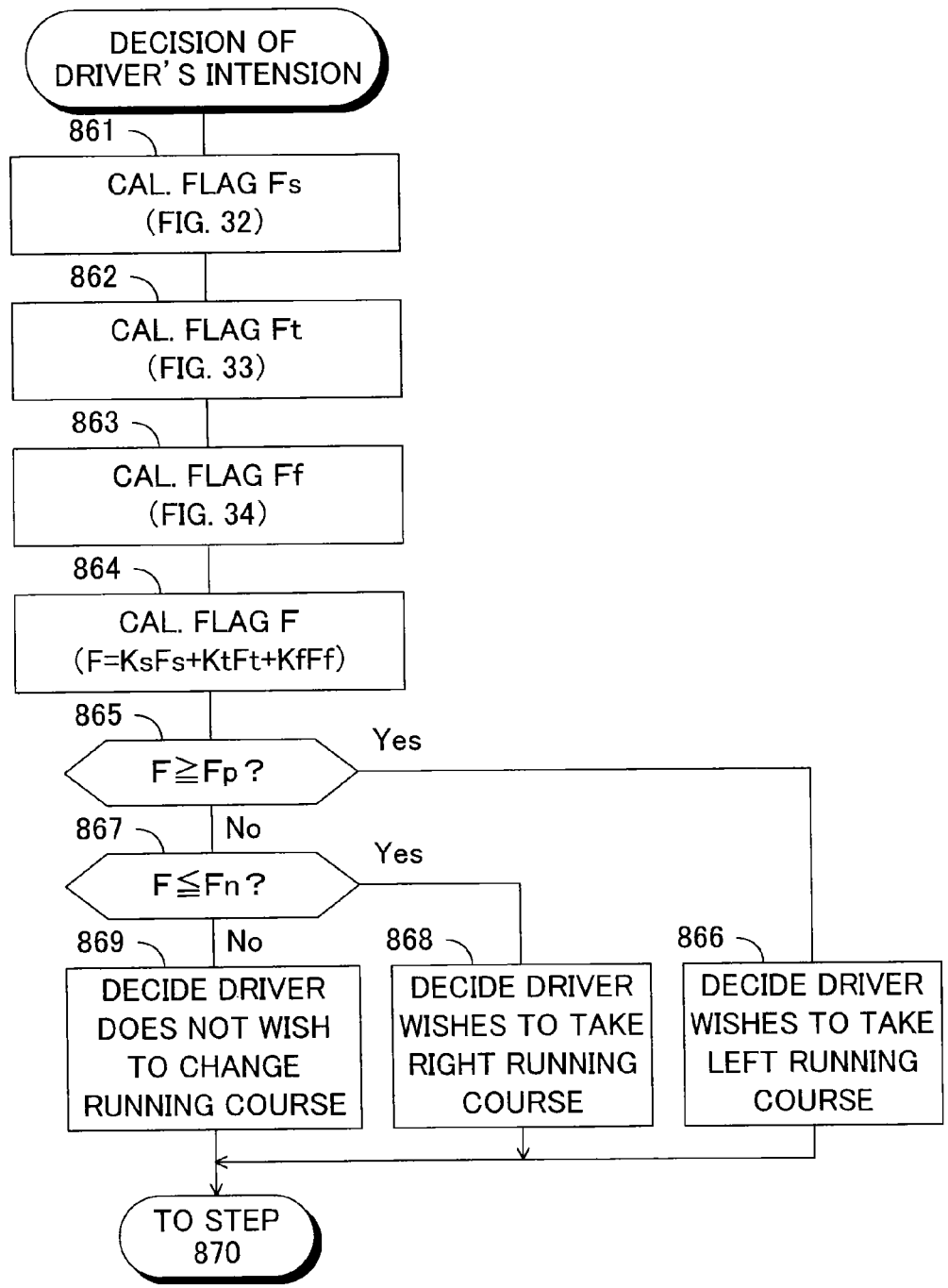
FIG. 27 is a flowchart showing the control routine for deciding the driver's final intension concerning change of running course in the third embodiment.

In step 860, in the situation where the vehicle has passed the branch point Q1, a decision is made as to the driver's final intension concerning selection of running course in accordance with the flowchart shown in the under-described FIG. 27.

In step 870, a decision is made as to whether or not the driver wishes to change the running course on the basis of the relationship between the running course which the driver wishes to take and the present target trajectory. When an affirmative decision is made, the control proceeds to step 900, whereas when a negative decision is made, the control proceeds to step 910.

<Control Routine for Announcing Existence of Branched Lane>

In step 841 in the flowchart shown in FIG. 25 which shows the control routine for announcing existence of a branched lane, a decision is made as to whether or not the target trajectory which the vehicle follows after it has passed the branch point Q1 is on the left side of the present travelling direction. When an affirmative decision is made, the control proceeds to step 843, whereas when a negative decision is made, the control proceeds to step 842.

In step 842, a decision is made as to whether or not the target trajectory which the vehicle follows after it has passed the branch point is on the right side of the present travelling direction. When an affirmative decision is made, the control proceeds to step 844, whereas when a negative decision is made, the control proceeds to step 845.

In step 843, target steered angles θlkaft and θlkart of the front and rear wheels and a target rotation angle θswt of the steering wheel 20 are calculated so that the angles make the vehicle 12 travel along the present target trajectory in a condition where the vehicle is shifted leftward relative to the present target trajectory. For example, as shown by an arrow of phantom line in FIG. 29, target steered angles of the front and rear wheels and a target rotation angle of the steering wheel 20 are calculated so that the angles make the vehicle 12 first slightly turns left and thereafter slightly turns right to thereby travel along the lane 84 in a condition where the vehicle is shifted leftward.

In step 844, target steered angles θlkaft and θlkart of the front and rear wheels and a target rotation angle θswt of the steering wheel 20 are calculated so that the angles make the vehicle 12 travel along the present target trajectory in a condition where the vehicle is shifted rightward relative to the present target trajectory.

In step 845, target steered angles θlkaft and θlkart of the front and rear wheels are calculated so that the angles prevent the vehicle 12 from being shifted leftward or rightward relative to the present target trajectory. A target rotation angle θswt of the steering wheel 20 is calculated to 0 so that the steering wheel does not rotate.

<Control Routine for Deciding Driver's Intension>

Figure 30:
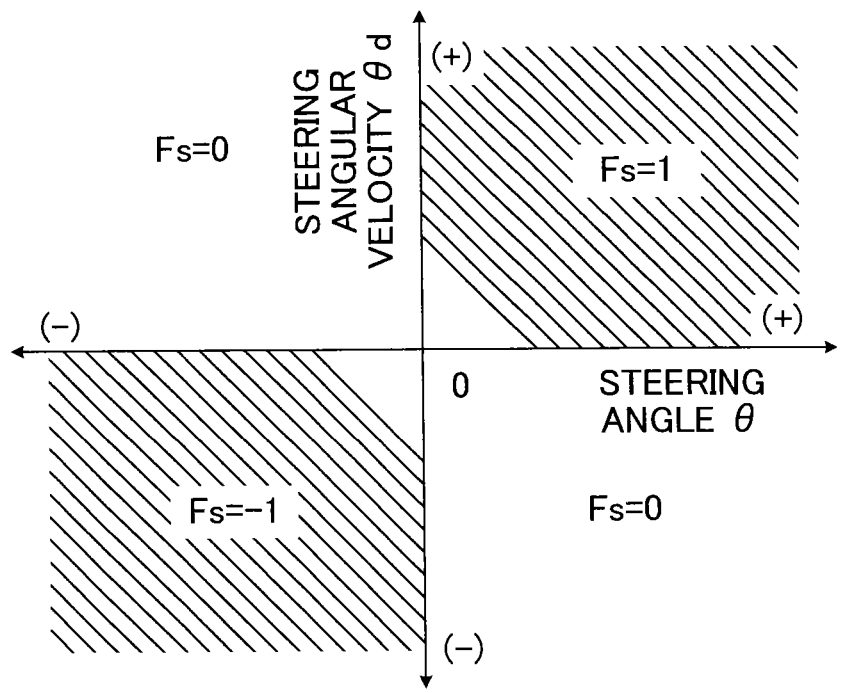
FIG. 30 is a map for deciding which road the driver wishes to take among the present road, a left branched road and a right branched road on the basis of steering angle θ, steering angular velocity θd and the like in a situation where the vehicle is on this side of a branch.

In step 851 in the flowchart shown in FIG. 26 which shows the control routine for deciding the driver's intension, a steering angular velocity θd which is a differential value of steering angle θ is calculated. A decision is made as to which lane the driver wishes to take among the present lane, a left branched lane and a right branched lane in accordance with a map shown in FIG. 30 on the basis of steering angle θ, steering angular velocity θd and the information that the branched lane is on the left side, on the right side or on both sides. When the lane the driver wishes to take is the present lane, a flag Fs is set to 0. When the lane the driver wishes to take is the left branched lane, the flag Fs is set to 1. When the lane the driver wishes to take is the right branched lane, the flag Fs is set to −1.

Figure 31:
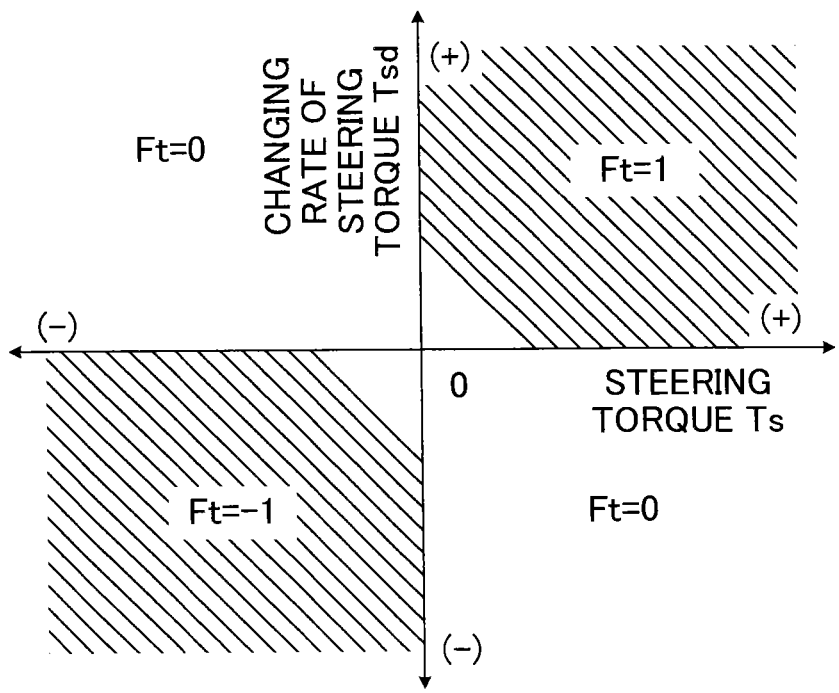
FIG. 31 is a map for deciding which road the driver wishes to take among the present road, a left branched road and a right branched road on the basis of steering torque Ts, rate of change of steering torque Tsd and the like in a situation where the vehicle is on this side of a branch.

In step 852, a rate of change of steering torque Tsd which is a differential value of steering torque Ts is calculated. A decision is made as to which lane the driver wishes to take among the present lane, a left branched lane and a right branched lane in accordance with a map shown in FIG. 31 on the basis of steering torque Ts, rate of change of steering torque Tsd and the information that the branched lane is on the left side, on the right side or on both sides. When the lane the driver wishes to take is the present lane, a flag Ft is set to 0. When the lane the driver wishes to take is the left branched lane, the flag Ft is set to 1. When the lane the driver wishes to take is the right branched lane, the flag Ft is set to −1.

In step 854, a flag F which is an index of the driver's intension to change running course is calculated in accordance with the following Formula 5. Coefficients Ks and Kt in the Formula 5 are larger than 0 and smaller than 1, such as 0.5, for example, and the sum of Ks and Kt is 1.

$$F = K_s F_s + K_t F_t \qquad (5)$$

In step 855, a decision is made as to whether or not the flag F is not smaller than a positive reference value Fp which is 1 or a positive constant slightly smaller than 1. When a negative decision is made, the control proceeds to step 857, whereas when an affirmative decision is made, the control proceeds to step 856 in which a decision is made that the driver wishes to change the running course to left branched lane.

In step 857, a decision is made as to whether or not the flag F is not larger than a negative reference value Fn which is −1 or a negative constant slightly larger than −1. When an affirmative decision is made, the control proceeds to step 858 in which a decision is made that the driver wishes to change the running course to right branched lane, whereas when a negative decision is made, the control proceeds to step 859 in which a decision is made that the driver does not wish to change the running course.

<Control Routine for Deciding Driver's Final Intension>

Figure 32:
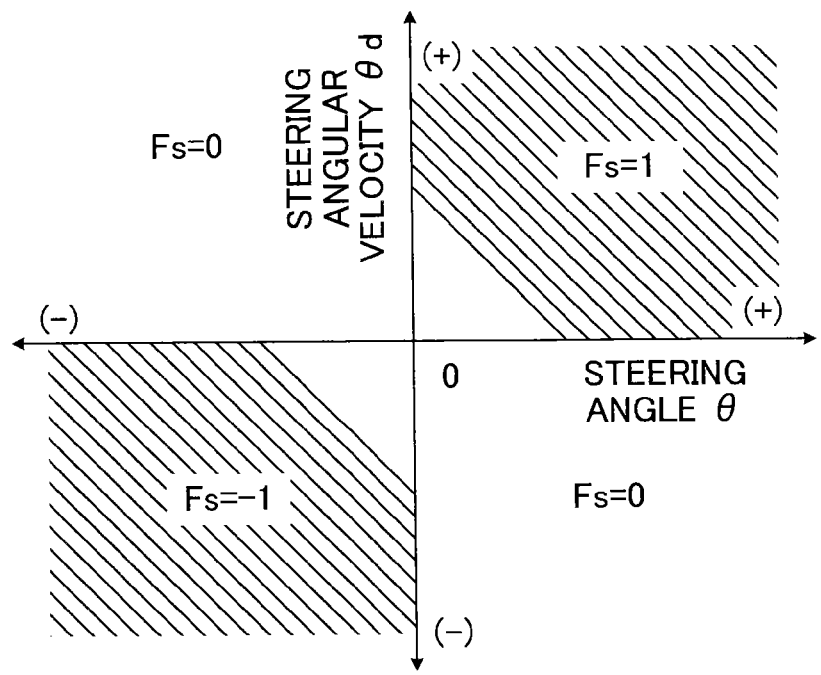
FIG. 32 is a map for deciding which road the driver wishes to take among the present road, a left branched road and a right branched road on the basis of steering angle θ, steering angular velocity θd and the like in a situation where the vehicle has passed the branch.
Figure 33:
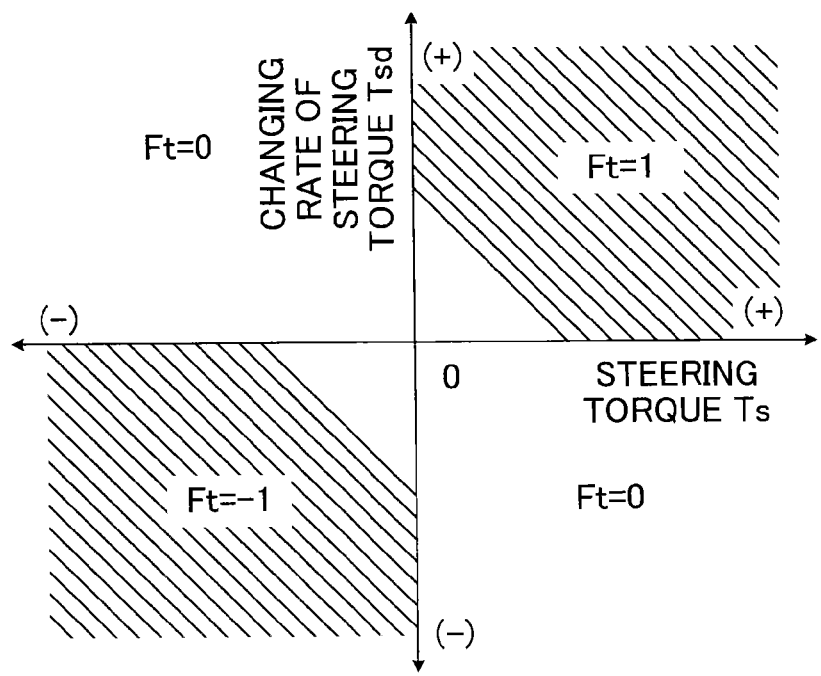
FIG. 33 is a map for deciding which road the driver wishes to take among the present road, a left branched road and a right branched road on the basis of steering torque Ts, rate of change of steering torque Tsd and the like in a situation where the vehicle has passed the branch.

Steps 861 and 862 in the flowchart shown in FIG. 27 which shows the control routine for deciding the driver's final intension are conducted in the same manners as steps 851 and 852, respectively, in the flowchart shown in FIG. 26. It is to be noted that the decisions in step 861 and 862 are conducted using maps shown in FIGS. 32 and 33, respectively. The magnitudes of the thresholds in the maps shown in FIGS. 32 and 33 are larger than those in the maps shown in FIGS. 30 and 31.

In step 863 which is conducted subsequent to step 862, a decision is made as to which lane the driver wishes to take among the present lane, a left branched lane and a right branched lane. When the lane the driver wishes to take is the present lane, a flag Ff is set to 0. When the lane the driver wishes to take is the left branched lane, the flag Ff is set to 1. When the lane the driver wishes to take is the right branched lane, the flag Ff is set to −1.

Figure 34:
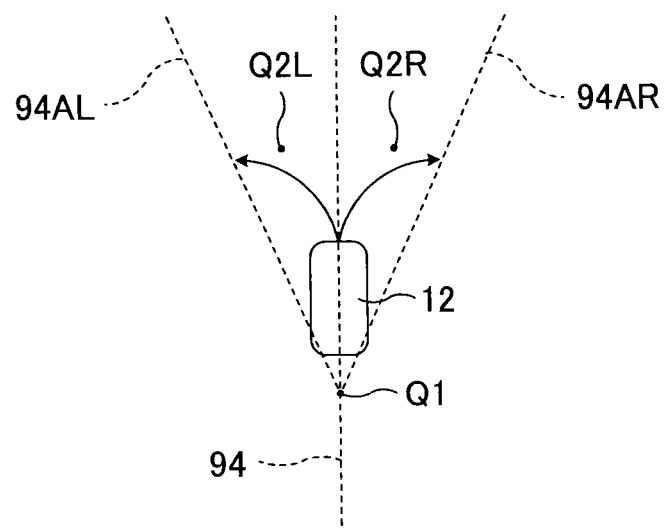
FIG. 34 is a map for deciding which road the driver wishes to take among the present road, a left branched road and a right branched road on the basis of the point on the present target trajectory, the position of the end point Q2 of the branch, steering angle θ and steering angular velocity θd.

In FIG. 34, for example, 94AL and 94AR represent target trajectories of left and right branched lanes, respectively. Q2L and Q2R represent end point of the left branched lane 94AL and end point of the right branched lane 94AR, respectively. Thus, a decision is made as to which lane the driver wishes to take among the present lane, a left branched lane and a right branched lane on the basis of the point of the vehicle on the present target trajectory 94, the position of the end point Q2L or Q2R of the branch, steering angle θ and steering angular velocity θd.

In step 864, a flag F which is an index of the driver's intension to change running course is calculated in accordance with the following Formula 6. Coefficients Ks, Kt and Kf in the Formula 6 are larger than 0 and equal to or smaller than 0.4, such as, for example, 0.3, 0.3 and 0.4, respectively, and the sum of Ks, Kt and Kf is 1.

$$F = K_s F_s + K_t F_t + K_f F_f \quad (6)$$

Steps 865 to 869 are conducted in the same manners as in steps 855 to 859, respectively, shown in FIG. 26. Thus, the driver's final intension is decided on the change of lane.

It is to be noted that steps 861 and 862 may be omitted and the flag F may be replaced with the flag Ff. Step 863 may be omitted and the flag F may be calculated in accordance with the above Formula 5.

<Control Routine for Changing Target Trajectory>

In step 901 in the flowchart shown in FIG. 28 which shows the control routine for changing the target trajectory, a decision is made as to whether or not the change of the target trajectory has been completed by the decision, for example, whether or not weight Ws herein below described has become 1. When an affirmative decision is made, the control proceeds to step 910, whereas when a negative decision is made, the control proceeds to step 902.

In step 902, a decision is made as to whether or not the calculation of deviation degree Ds herein below described has been initiated. When an affirmative decision is made, the control proceeds to step 905, whereas when a negative decision is made, the control proceeds to step 903.

In step 903, a decision is made as to whether or not the present position of the vehicle 12 is on this side of the branch point Q1 of the branched lane. When an affirmative decision is made, in step 904, the target trajectory which the vehicle 12 takes after passing the branch point Q1 is changed to a trajectory of the running course which is decided in step 850 or 860 that the driver wishes to take, whereas when a negative decision is made, the control proceeds to step 905.

In step 905, a deviation degree Ds which is an index indicating the necessity of changing the target trajectory is calculated. In the map shown in FIG. 32, with a reference line being represented by the boundary between the area where Fs=0 and the area where Fs=1 or −1, the deviation degree Ds is a value indicating the distance between the coordinates of steering angle θ and steering angular velocity θd and the reference line. In step 905, a maximum deviation degree Dsmax is calculated to a value which the deviation degree Ds assumes when increase value ΔDs of the deviation degree Ds of each cycle becomes equal to or smaller than a reference value ΔDs0 (a positive constant close to 0).

It is to be noted that a deviation degree Ds is calculated so that it increases as curvature of the track which the vehicle draws in response to alteration of the target trajectory. For example, a deviation degree Ds is calculated so that it increases as an angle between the two lanes of branched lane increases; it increases as the distance between branch point Q1 and the end point Q2 decreases; and it increases as the width of the lane decreases. In the branched lane shown in FIG. 29, a deviation degree Ds is calculated so that it is higher when the target trajectory changes from 94B to 94A as compared to when the target trajectory changes from 94A to 94B.

Figure 35:
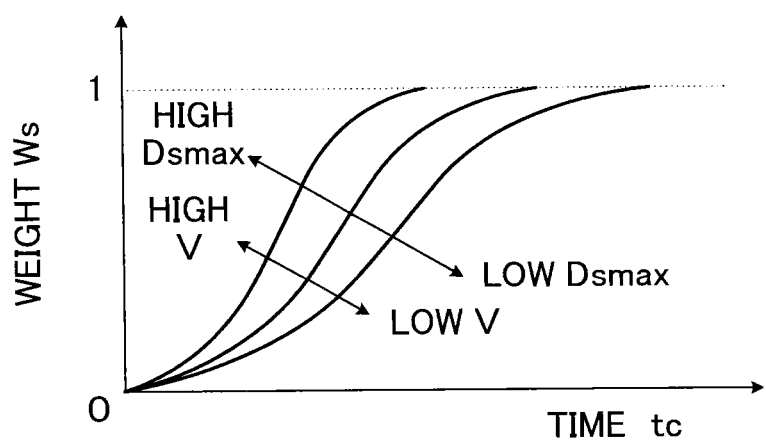
FIG. 35 is a map for calculating a weight Ws for the target trajectory after change on the basis of maximum deviation degree Dsmax, vehicle speed V and lapsed time tc.

In step 906, a weight Ws for the target trajectory after change is calculated from a map shown in FIG. 35 on the basis of maximum deviation degree Dsmax, vehicle speed V and lapsed time tc. As shown in FIG. 35, a weight Ws is calculated so that it varies from 0 to 1 as earlier as the maximum deviation degree Dsmax increase and as vehicle speed V increases. In addition, a weight Ws is calculated so that it becomes 1 before the vehicle 12 reaches the end point Q4 or Q5 of the section Scp for allowing alteration of the target trajectory shown in FIG. 29.

In step 907, the target trajectory is gradually changed in accordance with the weight Ws from the present target trajectory to a target trajectory of the running course which the driver wishes to take. For example, the curvatures of the present target trajectory and the target trajectory of the running course which the driver wishes to take being represented by Rpre and Rnew, respectively which are functions of time, a curvature Rins of a provisional trajectory for changing the target trajectory is calculated in accordance with the following Formula 7.

$$R_{ins} = (1 - W_s) R_{pre} + W_s R_{new} \quad (7)$$

As is understood from the above, in the third embodiment, in step 750 in the flowchart shown in FIG. 21, a decision is made as to whether or not a branch exists in the lane corresponding to the target trajectory. When a decision is made that a branch exists, in step 800, a decision is made as to whether or not the driver wishes to change the running course and the target trajectory is to be altered. In addition, when a decision is made that the target trajectory is to be altered, in step 900, the target trajectory is changed so that it becomes a trajectory of a running course corresponding to the driver's intension.

Therefore, according to the third embodiment, even in a case where the driver wishes to take another lane which does not correspond to the target trajectory for the reasons of a change of mind or road conditions in a situation where the vehicle approaches a branch of lane, the target trajectory can be re-set in accordance with the driver's intension. Thus, even in a case where the vehicle approaches a branch of lane and the driver wishes to change the running course, the vehicle can surely be made travel along a target trajectory which reflects the driver's intension.

In view of the above, the third embodiment may be considered as a technical idea concerning "a vehicle drive-control device which makes a vehicle travel along a target trajectory, wherein a decision is made as to whether or not a branch of the lane exists ahead of the vehicle; when a branch of the lane exists, a decision is made as to whether or not the driver wishes to change the target trajectory; and the change of the target trajectory is controlled in accordance with whether or not the driver has the intension to change the target trajectory."

According to the third embodiment, in step 810 in the flowchart shown in FIG. 24, a section for allowing alteration of the target trajectory is set. When the vehicle travels on this side of the branch point Q1 of the branched lane in the section for allowing alteration of the target trajectory, affirmative decisions are made in step 820 and 830. Then, in step 840, the occupants in the vehicle are announced that a branch exists by varying the lateral position and the like of the vehicle relative to the lane on the basis of the present target trajectory. In addition, in step 850, a decision is made as to the driver's intension concerning selection of running course and in step 870, a decision is made as to whether or not the driver wishes to change the running course.

Therefore, it is possible to decide the driver's intension concerning selection of running course more positively and more accurately as compared to where the lateral positions and the like of the vehicle relative to the lane are not varied, i.e. where the occupants are not announced that a branch exists.

According to the third embodiment, in a case where the vehicle travels in the section for allowing alteration of the target trajectory but has already passed the branch point Q1 of the branched lane, affirmative and negative decisions are made in steps 820 and 830, respectively. Accordingly, in step 860, in the situation where the vehicle has passed the branch point Q1, a decision is made as to the driver's final intension concerning selection of running course, and in step 870, on the basis of the result of the decision, a decision is made as to whether or not the driver wishes to change the running course.

Therefore, the possibility that the change of the running course and the change of the target trajectory accompanied thereto are effected in accordance with the driver's intension can more accurately be decided as compared to where the control proceeds to step 910 without conducting steps 860 and 870 when a negative decision is made in step 830. In other words, the vehicle drive-control can be achieved while more respecting the driver's intension as compared to where a decision is not conducted as to the driver's final intension concerning selection of running course in a situation where the vehicle has passed the branch point Q1.

According to the third embodiment, when the vehicle 12 travels on this side of the branch point Q1, an affirmative decision is made in step 903 in the flowchart shown in FIG. 28, and in step 904, the target trajectory is promptly changed to a trajectory of the running course which the driver wishes to take. Accordingly, the target trajectory can be changed to a trajectory of the running course which the driver wishes to take at the same time when the vehicle 12 ha passed the branch point Q1.

According to the third embodiment, when the target trajectory is to be changed in a situation where the vehicle 12 has passed the branch point Q1, a negative decision is made in step 903 and the target trajectory is changed in steps 905 to 907. In particular, in step 905, a deviation degree Ds which is an index indicating the necessity of changing the target trajectory and a maximum deviation degree Dsmax which is the maximum value thereof are calculated, and a weight Ws for the target trajectory after change is calculated so that the weight becomes 1 earlier as the maximum deviation degree Dsmax increases.

Figure 36:
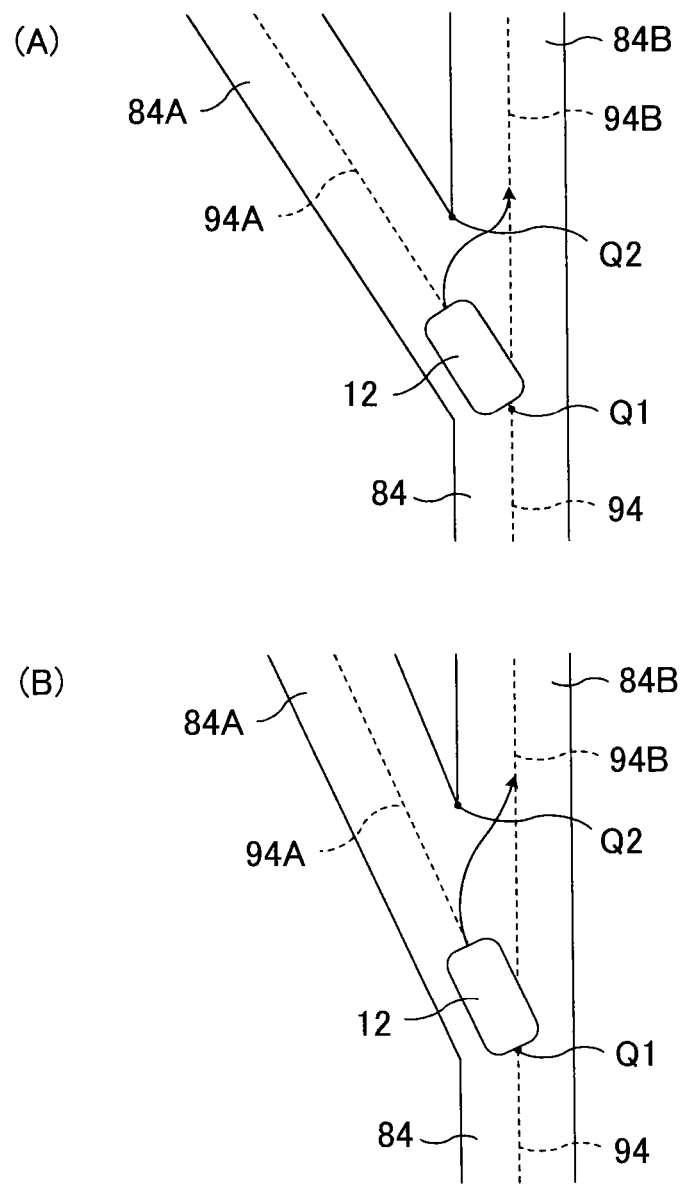
FIG. 36 is an explanatory view showing the trajectory of the vehicle drawn by means of the target trajectory being altered by the third embodiment for a case (A) where the angle between the two roads at a branch is large and a case (B) where the angle is small.

Therefore, as shown in FIG. 36(A), it is possible to change the steering angles of the front and rear wheels more rapidly to thereby positively change the running course as the necessity of controlling the speed in changing the direction of the vehicle to change the running course increases. On the contrary, as shown in FIG. 36(B), it is possible to change the steering angles of the front and rear wheels more gently to thereby reduce the risk of rapid change in the direction of the vehicle and uneasiness that the occupants in the vehicle feel due to the rapid change.

As already described, according to the first to third embodiments, an assist torque Tic for compensating inertia of the steering system and the electric power steering unit 22 is calculated on the basis of the second order differential value θfftdd of the final target steered angle θfft of the front wheels. Assist torques Tdc and Tfc for compensating viscosity and friction, respectively, in the steering system and the electric power steering unit 22 are calculated on the basis of the differential value θfftd of the final target steered angle θfft of the front wheels.

Therefore, a target assist torque Tlkat can be calculated the influences of the inertia and the like accompanied with the operation of the electric power steering unit 2 being lessened as compared to where assist torque Tic and the like are calculated on the basis of target steered angles θft and θrt of the front and rear wheels. Accordingly, the steered angles of the front and rear wheels and the rotation of the steering wheel 20 can be controlled more accurately as compared to where a target assist torque Tlkat is calculated without considering a target correction amount Δθsft of the steered angel of the front wheels calculated on the basis of the target rotation angle θswt.

According to the first to third embodiments, the announcement means (lateral shift) in the third embodiment is different from those in the first and second embodiments. Accordingly, even in a case where the first or the second embodiment is applied to an embodiment in combination with the third embodiment, the occupants in the vehicle can recognize the announcement distinguishing which it is concerning the change in curvature of the lane or concerning branched lane.

In the first to third embodiments, lateral offset of the vehicle relative to the center of the lane is not considered when a target rotation angle of the steering wheel 20 is calculated. However, in a situation where the vehicle is laterally shifted relative to the center of the lane, if such an announcement is given as the vehicle is shifted or turned greatly in the same direction as the lateral shift, the occupants in the vehicle may rather feel anxious.

Therefore, preferably, the amounts in varying operation position of the steering input means, yaw angle of the vehicle and lateral position of the vehicle are variably set in accordance with the offset of the vehicle so that the amounts become smaller when the changes are in the direction which increases the offset of the vehicle as compared to where the changes are in the opposite direction.

For example, in the first embodiment, in step 250, a target rotation angle θswt of the steering wheel 20 is calculated considering the offset of the vehicle. In the second embodiment, in step 550, a target control amount Δθyt of vehicle yaw angle is calculated considering the offset of the vehicle. In the third embodiment, in step 843 or 844, target steered angles θlkaft and θlkart of the front and rear wheels and a target rotation angle θswt of the steering wheel 20 are calculated considering the offset of the vehicle. According to these configurations, in a situation where the vehicle is laterally offset relative to the center of the lane, it is possible to prevent the announcement from being given which greatly moves the vehicle toward the side of the offset to thereby reduce the risk that the occupants in the vehicle rather feel anxious.

In the first to third embodiments, a target rotation angle θswt of the steering wheel 20 is calculated without considering the running safety of the vehicle. However, in a situation where the width of the lane is small or depending on the situations of the crowded conditions of the lane, existence or nonexistence of an oncoming vehicle, conditions of the road surface, vehicle speed and the curvature of the lane, there is a risk that the occupants feel anxious when an announcement is given which greatly moves or turns the vehicle.

Therefore, preferably, the amounts by which the operational position of the steering input means, the yaw angle of the vehicle and the lateral position of the vehicle relative to the lane are altered are variably set in accordance with the running safety of the vehicle so that the amounts decreases in a situation where the running safety of the vehicle is low as compared to where the running safety of the vehicle is high. The running safety of the vehicle may be decided on the basis of such indexes as width of the lane, the situations of the crowded conditions of the lane, existence or nonexistence of an oncoming vehicle, conditions of the road surface, vehicle speed and the curvature of the lane.

It is to be understood that consideration of the running safety of the vehicle is achieved by calculating a target rotation angle θswt of the steering wheel 20 and the like considering the running safety of the vehicle in the steps of calculations thereof as in the case where the vehicle is laterally offset. According to these configurations, in a situation where the running safety of the vehicle is low, it is possible to prevent the announcement from being given which greatly moves the vehicle toward the side of the offset to thereby reduce the risk that the occupants in the vehicle rather feel anxious.

Further, in the first to third embodiments, a target rotation angle θswt of the steering wheel 20 is calculated without considering the speed of the announcement which is varied in accordance with the magnitude of the control amount for announcement. In a situation where the magnitude of the control amount for announcement is large, even if the announcement is gently given, the occupants in the vehicle can recognize the announcement, but in a situation where the magnitude of the control amount for announcement is small, if the announcement is gently given, the occupants in the vehicle cannot recognize the announcement.

Therefore, preferably, speeds to change operation position of the steering input means and the like are variably set in accordance with the magnitudes of the changes in operation position of the steering input means and the like so that the speeds are higher in a situation where the magnitudes of the changes are small as compared to where the magnitudes of the changes are large.

It is to be understood that consideration of the magnitudes of the changes in operation position of the steering input means and the like is achieved by calculating a target rotation angle θswt and the like in the steps of calculations thereof so that the target values becomes their target control amounts earlier as the magnitudes of the changes in operation position of the steering input means and the like is small.

While the present invention has been described with reference to the above embodiments, it will be apparent to those skilled in the art that the present invention is not limited thereto, but may be embodied in various other forms without departing from the scope of the invention.

For example, in the above-described first to third embodiments, the means for announcing the change of vehicle traveling direction are the rotation of the steering wheel 20, the change in yaw angle of the vehicle and the change in lateral position of the vehicle relative to the lane. However, as an announcement means in the first and second embodiments, the change in lateral position of the vehicle relative to the lane and operation of winker may be added. As an announcement means in the third embodiment, the change in yaw angle of the vehicle and operation of winker may be added and decreasing in vehicle speed may further be added.

In the above-described first to third embodiments, the means for making the vehicle travel along a target trajectory are the steered angle varying unit 14, the electric power steering unit 22 and the rear steering device 42. However, in the first embodiment, as yaw angle of the vehicle is not controlled, the rear steering device may be omitted and the steered angel of the rear wheels may not be controlled. Accordingly, the first embodiment may be applied to a vehicle which is not equipped with the rear steering device 42 and in that case, as the calculation of target steered angle θlkart of the rear wheels in the trajectory control block 100 is not required, step 160 shown in FIG. 3 and steps 380 and 390 shown in FIG. 5 are omitted.

The third embodiment may also applied to a vehicle which is not equipped with the rear steering device 42 and the announcement on the possibility of the change in vehicle travelling direction may be achieved by rotation of the steering wheel 20 and the like.

In the above-described first to third embodiments, the steered angle of the front wheels is controlled to vary by the cooperation of the steered angle varying unit 14 and the electric power steering unit 22. However, in a vehicle which is not equipped with the steered angle varying unit 14, the control of the steered angle of the front wheels may be achieved by the power steering unit 22 to thereby make the vehicle travel along a target trajectory and conduct an announcement of the possibility that the vehicle traveling direction may be changed.

In the above-described first to third embodiments, the steering assist torque is controlled so that in a situation where the announcement is not conducted on the possibility that the vehicle traveling direction may be changed, even if the steered angle of the front wheels is controlled for the trajectory control, the steering wheel 20 may not rotate. However, the drive-control device of the present invention may be applied to a vehicle in which if the steered angle of the front wheels is controlled for the trajectory control in a situation where the announcement is not conducted on the possibility that the vehicle traveling direction may be changed, the steering wheel 20 is rotate.

In the above-described third embodiment, the curvature Rins of a provisional trajectory for changing the target trajectory is calculated as a weighed sum of the functions of the curvatures Rpre and Rnew of the present target trajectory and the target trajectory of the running course which the driver wishes to take. However, a provisional target steered angles of the font and rear wheels for changing the target trajectory may be calculated as a weighed sum of the present steered angles of the font and rear wheels and target steered angles of the font and rear wheels based on the target trajectory of the running course which the driver wishes to take.

In addition, in the above-described third embodiment, the announcement on the possibility that the vehicle traveling direction may be changed, i.e. the announcement on the existence of a branch is conducted by varying the position of the vehicle and the like toward the branched lane based on the present target trajectory. However, since the driver's intension can be decided by determining the driver's response against the announcement, varying the position of the vehicle and the like can be conducted opposite to the branched lane.

The invention claimed is:

1. A vehicle comprising:
a drive control device including a controller configured to execute trajectory control in which steered wheels are controlled so as to make the vehicle travel along a target trajectory;
a steering wheel configured to be operated by a driver and serve as a steering input device;
a power steering device configured to generate steering assist torque for steering front wheels which are steered wheels; and
a steering relation varying device that is provided between the steering wheel and the power steering device and is configured to vary a relationship between an operation position of the steering wheel and a steered angle of the front wheels,
wherein, when a possibility is determined to exist that a travel direction of the vehicle may be changed by the trajectory control, the controller announces the change in the travel direction of the vehicle by varying the operation position of the steering wheel with respect to the steered angle of said front wheels by controlling the power steering device and the steering relation varying device before the change in the travel direction is actually made by the trajectory control.

2. A vehicle comprising:
a drive control device including a controller configured to execute trajectory control in which steered wheels are controlled so as to make the vehicle travel along a target trajectory; and
a first power steering device configured to vary a steered angle of front wheels; and
a second power steering device configured to vary a steered angle of rear wheels,
wherein, when a possibility is determined to exist that a travel direction of the vehicle may be changed by the trajectory control, the controller announces the change in the travel direction of the vehicle by changing at least one of a yaw angle of the vehicle and a lateral position of the vehicle with respect to a lane by controlling the first and second power steering devices before the change in the travel direction is actually made by the trajectory control.

3. A vehicle comprising:
a drive control device including a controller configured to execute trajectory control in which steered wheels are controlled so as to make the vehicle travel along a target trajectory;
a steering wheel configured to be operated by a driver and serve as a steering input device; and
a steering relation varying device that is provided between the steering wheel and front wheels which are steered wheels and is configured to vary a relationship between an operation position of a steering wheel operated by a driver and a steered angle of the front wheels,
wherein, when a possibility is determined to exist that a travel direction of the vehicle may be changed by the trajectory control, the controller announces the change in the travel direction of the vehicle by changing the operation position of the steering wheel by controlling the steering relation varying device to vary the operation position of said steering wheel with respect to the steered angle of said front wheels before the change in the travel direction is actually made by the trajectory control.

4. A vehicle comprising:
a drive control device including a controller configured to execute trajectory control in which steered wheels are controlled so as to make the vehicle travel along a target trajectory;
a steering wheel configured to be operated by a driver and serve as a steering input device;
a first power steering device configured to generate steering assist torque for steering front wheels which are steered wheels;
a steering relation varying device that is provided between the steering wheel and the first power steering device and is configured to vary a relationship between an operation position of the steering wheel and a steered angle of the front wheels; and
a second power steering device configured vary a steered angle of rear wheels,
wherein, when a possibility is determined to exist that a travel direction of the vehicle may be changed by the trajectory control, the controller announces the change in the travel direction of the vehicle by changing, at least one of a yaw angle of the vehicle and a lateral position of the vehicle by controlling the first power steering device, the steering relation varying device, and the second power steering device before the change in the travel direction is actually made by the trajectory control.

5. The vehicle according to claim 1, wherein an amount, by which the operation position of the steering wheel is varied before the change in the travel direction is actually made by the trajectory control, is increased when a change degree of the travel direction of the vehicle is high as compared to the amount when the change degree of the travel direction of the vehicle is low.

6. The vehicle according to claim 1, wherein in a situation where the vehicle is laterally offset with respect to the center of a road, an amount, by which the operation position of the steering wheel is varied before the change in the travel direction is actually made by the trajectory control in a direction increasing an amount of the offset, is smaller, as compared to where the change is made in a direction decreasing the amount of the offset.

7. The vehicle according to claim 1, wherein an amount, by which the operation position of the steering wheel is varied before the change in the travel direction is actually made by the trajectory control, is decreased when a running safety of the vehicle is low, as compared to where a running safety of the vehicle is high.

8. The vehicle according to claim 6, wherein when the amount, by which the operation position of the steering wheel is varied before the change in the travel direction is actually made by the trajectory control, is small, a speed of the variation of the operation position of the steering wheel is increased, as compared to where the change amount is large.

9. The vehicle according to claim 1, wherein
the possibility that the travel direction of the vehicle may be changed by the trajectory control is a possibility due to a change of the target trajectory effected by the driver at a branch of a road, and
the variation, of the operation position of the steering wheel before the change in the travel direction is actually made by the trajectory control, is effected to a side opposite to the travel direction of the vehicle after the change in the travel direction is actually made.

10. The vehicle according to claim 1, wherein when there is a branch having a travel direction different from that determined by the target trajectory which has been set and a possibility exists that the travel direction of the vehicle may be changed due to a change of the target trajectory effected by the driver, the controller is configured to determine whether or not the target trajectory is to be altered on a basis of an operation by the driver on the steering wheel.

11. The vehicle according to claim 10, wherein the controller is configured to:
set a decision-making travel section for deciding whether or not the target trajectory is to be altered on this side of the branch, and
determine whether or not the target trajectory is to be altered on the basis of the operation conducted by the driver on the steering wheel in the decision-making travel section.

12. The vehicle according to claim 11, wherein the controller is configured to:
set an end point of the decision-making travel section on this side of the branch, and
set a start point of the decision-making travel section at a position which is spaced by a predetermined distance on this side of the end point.

13. The vehicle according to claim 11, wherein when at least one of an amount and a speed of the operation conducted by the driver on the steering wheel after the vehicle has passed the decision-making travel section are large, the controller is configured to effect the change of the target trajectory more quickly, as compared to where the at least one of the amount and the speed are small.

14. The vehicle according to claim 1, wherein the possibility that the travel direction of the vehicle may be changed by the trajectory control is a possibility due to at least one of a change of the target trajectory caused by a change in curvature of a road which arises as the vehicle travels and a change of the target trajectory effected by the driver at a branch of the road.

15. The vehicle according to claim 1, wherein the controller is configured to effect the variation, of the operation position of the steering wheel before the change in the travel direction is actually made by the trajectory control, to a same side as the travel direction of the vehicle after the change while controlling the steered angle of the steered wheels so that the vehicle may travel along the target trajectory.

16. The vehicle according to claim 1, wherein the steering relation varying device is configured to vary the operation position of the steering wheel with respect to the steered angle of the front wheels by rotating a lower shaft connected to the power steering device relative to an upper steering shaft connected to the steering wheel so as to announce the change in the travel direction of the vehicle made by the trajectory control before the change in the travel direction is actually made by the trajectory control.

17. The vehicle according to claim 2, wherein
the first power steering device is configured to vary the steered angle of the front wheels by transferring rotational motion of a first motor to the front wheels so as to announce the change in the travel direction of the vehicle made by the trajectory control before the change in the travel direction is actually made by the trajectory control, and
the second power steering device is configured to vary the steered angle of the rear wheels by transferring rotational motion of a second motor to the rear wheels so as to announce the change in the travel direction of the vehicle made by the trajectory control before the change in the travel direction is actually made by the trajectory control.

18. The vehicle according to claim 3, wherein the steering relation varying device is configured to vary the operation position of the steering wheel with respect to the steered angle of the front wheels by rotating a lower shaft connected to front wheels relative to an upper steering shaft connected to the steering wheel so as to announce the change in the travel direction of the vehicle made by the trajectory control before the change in the travel direction is actually made by the trajectory control.

19. The vehicle according to claim 4, wherein
the steering relation varying device is configured to vary the operation position of the steering wheel and with respect to the steered angle of the front wheels by rotating a lower shaft connected to the power steering device relative to an upper steering shaft connected to the steering wheel so as to announce the change in the travel direction of the vehicle made by the trajectory control before the change in the travel direction is actually made by the trajectory control, and
the second power steering device is configured to vary the steered angle of the rear wheels by transferring rotational motion of a motor to the rear wheels so as to announce the change in the travel direction of the vehicle made by the trajectory control before the change in the travel direction is actually made by the trajectory control.

20. The vehicle according to claim 1, wherein the controller announces the change in the travel direction of the vehicle by controlling the power steering device and the steering relation varying device such that the steering wheel turns and the front wheels do not correspondingly turn.

* * * * *